(12) United States Patent
Tomassi

(10) Patent No.: US 10,985,603 B2
(45) Date of Patent: *Apr. 20, 2021

(54) THREE-SOURCE AUTOMATIC REDUNDANT BYPASS-ISOLATION SWITCHES AND RELATED POWER SYSTEMS AND METHODS

(71) Applicant: Eaton Intelligent Power Limited, Dublin (IE)

(72) Inventor: Mark Steven Tomassi, Waynesville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 65 days.

This patent is subject to a terminal disclaimer.

(21) Appl. No.: 16/454,527

(22) Filed: Jun. 27, 2019

(65) Prior Publication Data

US 2020/0091761 A1    Mar. 19, 2020

Related U.S. Application Data

(63) Continuation of application No. 15/632,957, filed on Jun. 26, 2017, now Pat. No. 10,389,170, which is a continuation of application No. 14/166,488, filed on Jan. 28, 2014, now Pat. No. 9,692,254.

(51) Int. Cl.
*H02J 9/00* (2006.01)
*H02J 9/06* (2006.01)
*H01H 9/26* (2006.01)

(52) U.S. Cl.
CPC .............. *H02J 9/061* (2013.01); *H01H 9/26* (2013.01); *H01H 2300/018* (2013.01)

(58) Field of Classification Search
CPC ...................................................... H02J 9/061
USPC .......................................................... 307/65
See application file for complete search history.

(56) References Cited

U.S. PATENT DOCUMENTS

| 7,973,253 B2 | 7/2011 | Gibbs et al. |
| 2008/0080104 A1 | 4/2008 | Yagudayev et al. |
| 2008/0088183 A1 | 4/2008 | Eckroad et al. |
| 2010/0141047 A1 | 6/2010 | Gibbs et al. |

OTHER PUBLICATIONS

ATC-800 Controller, General Description, Taylor Power Systems, pp. 25062-25065 (Sep. 2011).
International Search Report and Written Opinion for corresponding PCT Application No. PCT/US2015/011952 (14 pages) (dated May 13, 2015).

*Primary Examiner* — Rexford N Barnie
*Assistant Examiner* — Dru Parries
(74) *Attorney, Agent, or Firm* — Myers Bigel, P.A.

(57) ABSTRACT

Power systems include a housing and an automatic transfer switch (ATS switch) held in the housing, a Bypass switch held in the housing and a control circuit in communication with the ATS switch and the Bypass switch to automatically direct the Bypass switch and the ATS switch to carry out the selective connections to thereby allow automated, redundant power transitions to the system load from three different power sources.

20 Claims, 13 Drawing Sheets

THREE-SOURCE AUTOMATIC REDUNDANT BYPASS-ISOLATION SWITCHES AND RELATED POWER SYSTEMS AND METHODS

RELATED APPLICATIONS

This application is a continuation of U.S. patent application Ser. No. 15/632,957, filed Jun. 26, 2017, which is a continuation of U.S. patent application Ser. No. 14/166,488, filed Jan. 28, 2014, which issued as U.S. Pat. No. 9,692,254 on Jun. 27, 2017, the contents of which are hereby incorporated by reference as if recited in full herein.

FIELD OF THE INVENTION

The present invention relates to bypass isolation open or closed transition automatic transfer switch assemblies.

BACKGROUND OF THE INVENTION

Many facility installations use an automatic transfer switch (ATS) to maintain power and protect against power outages. Certain installations, e.g., data centers, hospitals, water treatment plants and the like, need power systems (hereinafter "the system load") structured to provide a substantially uninterruptible power supply. In these cases, redundant power sources are desired. The primary power source is usually the public power grid and the secondary power source is usually a generator. However, the power sources can be different utility grids or even all generators or other power sources. For example, an Uninterruptible Power Supply (UPS) can be a power source for a small amount of time. Basically any power source that need to be switched with a load output can be a power source.

The ATS switches are used to protect critical electrical loads against loss of power. The load's primary of first power source is backed up by a second power source. The transfer switch is connected to both of the power sources and supplies the load with power from one of the sources. In the event that power is lost from the first power source, the transfer switch transfers the load to the second power source. This transfer is automatic.

The ATS assembly can include a Bypass (Isolation) switch. The Bypass switch is an assembly used with a transfer switch that electrically isolates the transfer switch for inspection and/or maintenance. The ATS with Bypass switch assembly typically has two separate switches or switch (sub) assemblies, the ATS switch and the Bypass switch, that can transfer power to the system load. Each of the two switches has positions to transfer the load from a primary power source (e.g., S1) to a back-up power source (e.g., S2). The ATS switch is the main switch that transfers power and the Bypass switch is typically used for when the ATS switch is in maintenance. The Bypass switch has an assembly that is usually fixed within the enclosure although there is a removable Bypass switch assembly that can be slidably withdrawn on rails. The main difference is that the fixed configuration Bypass switch does not have a truck or rail to slidably allow the device to be drawn out in contrast to a removable type. See, e.g., U.S. Pat. No. 7,973,253, and U.S. Patent Application Publication No. 2010/0141047, the contents of which are hereby incorporated by reference as if recited in full herein.

Despite the above, there remains a need for alternate ATS assembly configurations.

SUMMARY OF EMBODIMENTS OF THE INVENTION

Embodiments of the invention provide power systems for powering a system load. The systems include: (a) a housing; (b) a automatic transfer switch (ATS switch) held in the housing and configured to selectively (i) connect a system load to a first power source, (ii) connect the system load to a second power source, and (iii) disconnect the system load from the first and second power sources; (c) a Bypass switch held in the housing and configured to selectively (i) connect the system load to the first power source, (ii) connect the system load to a third power source, and (iii) disconnect the system load from the first and third power sources; and (d) a control circuit in communication with the ATS switch and the Bypass switch to automatically direct the Bypass switch and the ATS switch to carry out the selective connections to thereby allow automated, redundant power transitions to the system load from three different power sources.

The Bypass switch and the ATS switch can include circuit breakers and/or can be configured as three position contact switches.

The control circuit can include at least one processor that receives a plurality of defined position or status inputs, including inputs from the Bypass switch, the ATS switch, and the first, second and third power sources, and sends or directs another circuit component to send output control signals including control signals for changing switch selection between the ATS switch and the Bypass switch and switch status.

The housing can include at least one lockable access door and sensors that provide input to the control circuit on whether the door is open or closed, whether the ATS switch is locked-in position, and whether the Bypass switch is locked-in position (among other control signals for operation and/or safety).

The control circuit can support a plurality of defined power transitions protocols to transfer power between the system load and the first, second and third power sources to allow for different automatic transitions using the ATS switch and the Bypass switch to thereby provide redundancy in power switching and power back-up.

The housing can include only the ATS switch and the Bypass switch as an ATS Bypass isolation switch configured to allow the Bypass switch to perform Bypass isolation.

The ATS switch and the Bypass switch can reside adjacent each other in the housing and can be configured so that each can be removed from the housing as separate units.

The ATS switch unit can include electrical connections that engage the system load and the first and second power sources with the ATS switch electrically between and controlling the connections between the system load and the first and second power sources. The Bypass switch unit can include electrical connections that engage the system load and the first and third power sources with the Bypass switch electrically between and controlling the connections between the system load and the second and third power sources.

The ATS switch, the Bypass switch and the control circuit can define a three source ATS Bypass switch that can perform one or more of the following: Open transition, Closed transition, Time-Delay Neutral, In-Phase transition, and Load Voltage Decay transition from any of the first, second and third sources to the system load.

The ATS switch, the Bypass switch and the control circuit can define a three source ATS Bypass switch that can perform Closed/In-Phase Transition default to Time Delay Neutral mode and/or Closed/In-phase Transition default to Load Voltage Decay mode from any of the first, second and third sources to the system load.

The ATS switch, the Bypass switch and the control circuit can define a three source ATS Bypass switch that can perform Closed Transition default to Time Delay Neutral mode and/or Closed Transition default to Load Voltage Decay mode from any of the first, second and third sources to the system load.

The ATS switch, the Bypass switch and the control circuit can define a three source ATS Bypass switch that can perform In-Phase default to Time Delay Neutral mode and/or In-phase default to Load Voltage Decay mode from any of the first, second and third sources to the system load.

The control circuit can be configured to provide automatic operation of the ATS switch and the Bypass switch using input signals from and control signals to the ATS switch, the Bypass switch and the first, second and third power sources. The first power source can be a primary power source and the second and third power sources can be back-up power sources. The automatic operation includes one or more of the following: a) starting one or two of the second and third power sources based on identified predefined conditions; b) shutting down one of the second or third power sources after a defined time delay; c) alternating the second and third power sources to act as a primary back up power source based on user input; d) alternating the second and third power sources to act as a primary back up power source depending on operational time ran; e) allowing a user settable Load or No-Load test; f) identifying a failed or dysfunctional power source and starting another one of the power sources after a defined time; and g) running a test with a defined test routine on one or more of the power sources and using one or both of the ATS switch and/or Bypass switch based on a programmable calendar to select a test.

The ATS switch and Bypass switch can be configured to allow manual operation based on a user input to connect the ATS switch and/or Bypass switch to a selectable power source.

The control circuit can be configured to provide all automatic operation of the Bypass switch and the ATS switch so that if the ATS switch has a detected fault based on digital and/or analog input signals of ATS switch status the control circuit will disconnect the ATS switch and engage the Bypass switch.

The control circuit can be configured to provide all automatic operation of the Bypass switch and the ATS switch so that if the Bypass switch has a detected fault based on digital and/or analog input signals of Bypass switch status the control circuit will disconnect the Bypass switch and engage the ATS switch.

Other embodiments are directed to Automated Transfer Switch (ATS) Bypass switch assemblies. The assemblies include: (a) a housing; (b) a withdrawable ATS switch in the housing; (c) a Bypass switch in the housing; and (d) a control circuit in communication with the ATS switch and the Bypass switch. The ATS Bypass switch assembly can have four operational configurations: (1) a first closed configuration coupling and providing electrical communication between a first power source (S1) and a system load; (2) a second closed configuration coupling and providing electrical communication between a second power source (S2) and the system load; (3) a third closed configuration coupling and providing electrical communication between a third power source (S3) and the system load; and (4) a fourth configuration that does not couple or provide electrical communication between any of the first, second or third power sources and the system load.

The control circuit can include at least one controller that receives a plurality of defined position or status inputs, including inputs from the Bypass switch, the ATS switch, and the first, second and third power sources, and that sends or directs another circuit component to send output control signals including control signals for changing switch selection between the ATS switch and the Bypass switch and switch status.

Still other embodiments are directed to methods of controlling a power system. The methods include: (a) providing a three source Automated Transfer Switch (ATS) Bypass switch assembly comprising an ATS switch and a Bypass switch; (b) connecting a primary power source to the ATS Bypass switch assembly to be able to electrically engage each of the ATS switch and the Bypass switch; (c) connecting a system load to the ATS Bypass switch assembly to be able to electrically engage each of the ATS switch and the Bypass switch; (d) connecting a first back-up power source to the ATS Bypass switch assembly to be able to electrically engage only the ATS switch; (e) connecting second back-up power source to the ATS Bypass switch assembly to be able to electrically engage only the Bypass switch; and (f) electronically controlling operation of the ATS Bypass switch assembly to automatically engage either the ATS switch or the Bypass switch and an appropriate power source selected from the primary power source, the first back-up power source of the second back-up power source based on defined logic input conditions and power transition routines.

The primary power source can be a public power grid, and at least one of the first or second back-up power sources can be a generator, a UPS or a second power grid.

The electronically controlling operation can include one or more of the following: a) starting one or two of the back-up power sources based on identified predefined conditions; b) shutting down one of the back-up power sources after a defined time delay; c) identifying the second and third back-up power sources to act as a primary back up power source based on user input; d) alternating the second and third back-up power sources to act as a primary back up power source to alternate depending on operational time ran; e) allowing a user selectable Load or No-Load test; f) identifying a failed or dysfunctional power source and starting another one of the power sources after a defined time; and g) running a test with a test routine on one or more of the power sources and using one or both of the ATS switch and/or Bypass switch based on a programmable calendar to select the test.

The method can include all of actions (a)-(g).

The ATS Bypass switch assembly can reside in a single enclosure and the ATS switch and the Bypass switch can reside adjacent each other in the enclosure.

Although the different automatic transition scenarios can be completed on the ATS side of the ATS Bypass switch and also the Bypass switch, the three source power inputs with redundancy in the switch, power, and optionally also a processor or controller, brings a new form of automatic switch that can perform the transitional scenarios for breakers or contactors.

The disclosed concept provides that the both the ATS and Bypass switches, with some type of analog or digital electronic or electromechanical controller can be used as an automatic switching device (rather than manual) in the case of the switches being Locked In, Isolated, or Removed. The interlock assembly or rather electrical interlocks have a control system structured to configure the switch assemblies and to monitor the configuration of the ATS and Bypass switch assemblies. The position of each contact in the breaker or contactor, are monitored by the control system which then controls the contact arm for moving to Position A side, Position B Side, or Trip (open). This ensures that the system load will not be coupled electrically with two separate power sources, unless instructed to do so, such as for a type of scenario called closed transition (make before break). Both the ATS and the Bypass switches are used in the three source set-up.

Embodiments of the invention use both switches and three electrical power sources for an automatic switch, rather than just manual, and can be configured to carry out different types of transitions including open, closed, in-phase, load voltage decay, delay (Time Delay Neutral), or any sequence of the listed transitions in any different order with any source.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

Figure 1:
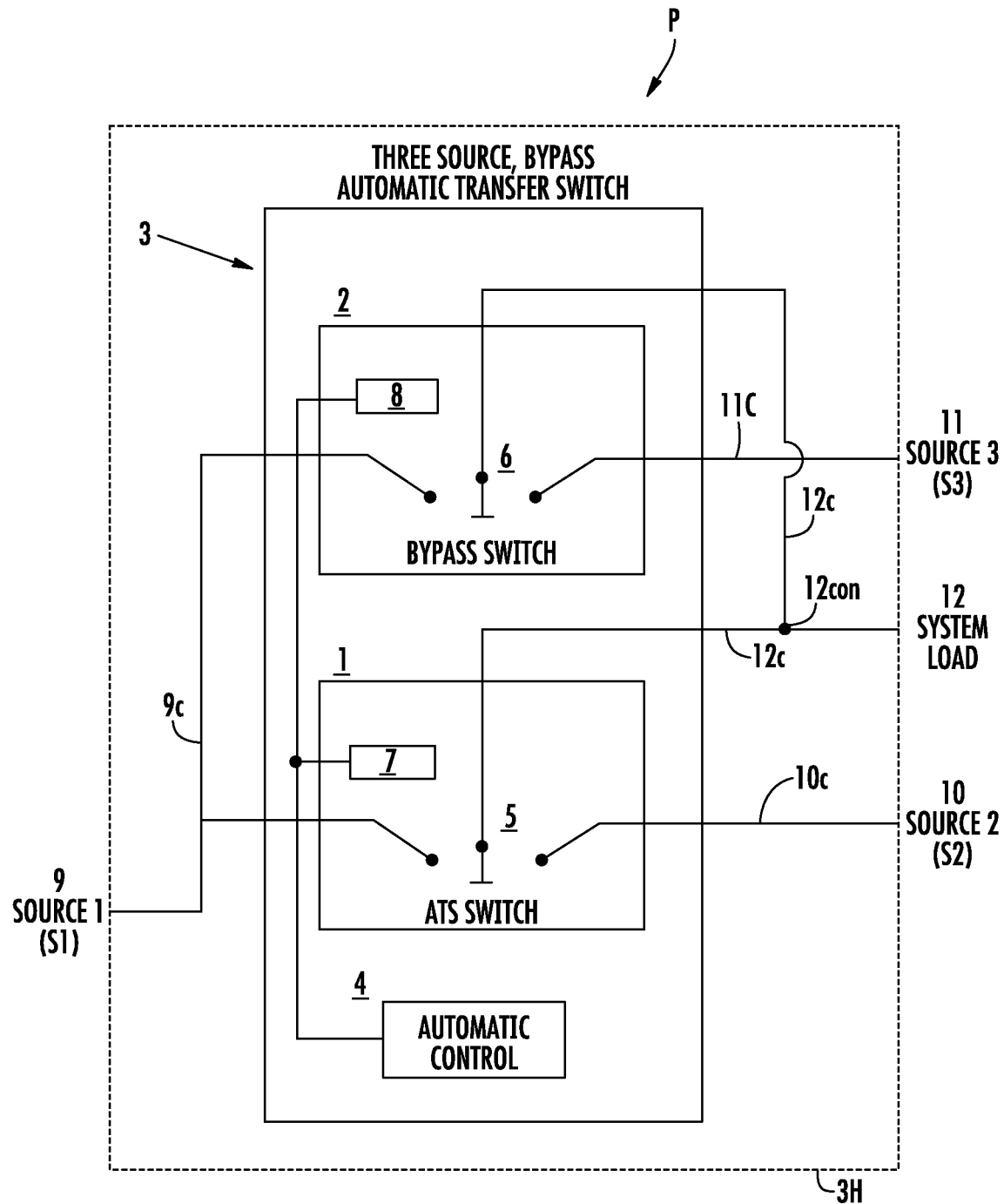
FIG. 1 is a schematic block diagram of a power system with the ATS and the Bypass switches, three power sources, the system load and a control circuit according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'''). Broken lines illustrate optional features in the figures unless stated otherwise.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted numerical value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As employed herein, the term "automatic" shall mean that an electronic circuit (e.g., processor) can change an operational state of a number of switches electrically if permitted by a corresponding logic state or programmatic controlled logic. The term "automatic" does not require manual operation.

As employed herein, the term "system load" shall mean any number of loads downstream of an ATS Bypass switch. A system load may include, for example and without limitation, loads of a relatively large installation such as a building or manufacturing plant.

As employed herein, the terms "ATS switch" and "Bypass switch" are two respective sub-switches of an ATS Bypass switch, and each of the two sub-switches includes electrical switching apparatus, such as for example and without limitation, contactors and/or circuit breakers, each of which can switch a system load to or from one or more power sources.

As used herein, "open transition" is the type of transition from power sources that will have an "off time" during the switching between sources.

As used herein, "dead time" is the amount of time, usually described in milliseconds that measures how long in the off position the switching is from each source As used herein, "overlap" is when each power source may be on the load at the same time and is measured in milliseconds.

As used herein, "three position contactor" is a contactor switch with three positions, closed to source 1, closed to source 2 (or closed to source 3) and open (trip). Time delays at the open position can be implemented.

Certain logic sequences described and/or claimed are with reference to functionality at or in the switch assembly for automatic selective control of and power transfer between one of the three sources through the ATS Bypass switch assembly 3 (FIG. 1) through the use of electrical and/or electronic signals via a control circuit 4.

The control circuit 4 (FIG. 1) typically comprises at least one controller. The term "controller" is used broadly and includes control circuitry, such as one or more microcontrollers, programmable logic controllers (PLCs), digital signal processors, or Integrated Circuits (ICs). The ICs can optionally include at least one Application-Specific Integrated Circuit "ASIC."

The ATS Bypass switch assembly 3 with the control circuit 4 can perform the following types of transfers for the three sources. These are stated in no particular order. Automatic operation is understood to transfer a system load from one power source to another power source whether from Source 1 to Source 2 or Source 2 to Source 1 or Source 1 to Source 3 or Source 3 to Source 1 or Source 2 to Source 3 or Source 3 to Source 2. This also could include a neutral or trip (open) position. The ATS Bypass switch assembly 3 can be configured to electronically automatically perform the following type of transfers: Open Transition, In-Phase Transition, Time Delay Neutral, Load Voltage Decay, Closed Transition, Closed In-Phase Transition with different default operation, and In Phase with different default operation, as described further below.

Open Transition: Transfer switches of the "open-transition" type provide a break-before-make transfer sequence, i.e., the load is disconnected from one source, prior to being connected to an alternate source. The transfer sequence depends on what type of time delays the users or OEM set a controller type device to. Three examples are Time Delay Normal to Emergency, Time Delay Neutral, and Time Delay Emergency to Normal. The Time Delay Neutral, for example, when set, takes place when the load is transferred in either direction to prevent excessive in-rush currents due to out-of-phase switching of large motor loads. With any of these set, the delay occurs before a transfer. A power interruption may be noticeable to the service (building/facility).

In-Phase Transition: In-phase transition is an open transition that occurs when both sources are in phase. The advance angle is calculated based on the frequency difference between the two sources and also the response time of the breaker or contactor. If the settable synchronize timer does not time out, the controller will continue to synchronize. This results in the optimum reconnect angle of about 0 degrees for all of the frequency difference values. When the phase difference is within the advance angle window, the "transfer" command is given. This is an open transition but both sources will be in-phase when the transfer occurs.

Time Delay Neutral ("TDN"): In either direction of switching, TDN is a user setting that will count down during a transfer at the neutral or open time of the breaker or contactor. This includes any delay in the neutral mode and any name that it is called.

Load Voltage Decay: This feature utilizes the load voltage measurements to sense back EMF that is generated when the transfer switch is in the Neutral position. It provides a delay in transfer in either direction if an unacceptable level is sensed as established by a (typically user) programmed level. The transfer will not take place until the back EMF decays below the acceptable programmed level.

Closed Transition: Closed Transition will temporarily parallel two live sources in a make-before-break scheme when performing a transfer. This achieves a transfer between sources with no power interruption. Both sources must be synchronized in frequency, phase, and voltage before the transfer is initiated. A transfer example is: the source (e.g., S2) from which the load is being transferred remains closed until the alternate source (e.g., S1), to which the load is being transferred, is also closed. After both have been closed, the source (e.g., S2) from which the load is being transferred is opened (trip). The period of time that both sources are closed may be specified at less than 100 milliseconds. Although the closed transition switch is not a substitute for an uninterruptable power source, it does eliminate power interruptions to loads except to those caused by power sources or equipment external to the transfer switch.

Closed/In-Phase Transition default to Time Delay Neutral mode: Closed Transition will temporarily parallel two live sources in a make-before-break scheme when performing a transfer. Both sources must be synchronized in frequency, phase, and voltage before the transfer is initiated. A transfer example is: the source (e.g., S2) from which the load is being transferred remains closed until the alternate source (e.g., S1), to which the load is being transferred, is also closed. After both have been closed, the source (e.g., S2) from which the load is being transferred is opened (trip) for S1 to S2, example. The period of time that both sources are closed may be specified at less than 100 milliseconds. If closed transition synchronization is not achieved within the window in the settable time period, the unit goes into In-phase transition, which is an open transition that occurs when both sources are in-phase. The advance angle is calculated based on the frequency difference between the two sources and also the response time of the breaker or contactor. This results in the optimum reconnect angle of about 0 degrees for all of the frequency difference values. When the phase difference is within the advance angle window, the "transfer" command is given. If the phase difference is not within the advance angle window in the settable time period, then the switch transfers with a delay that is set for Time Delay Neutral (delay setting in neutral).

Closed/In-Phase Transition default to Load Voltage Decay mode: Closed Transition will temporarily parallel two live sources in a make-before-break scheme when performing a transfer. Both sources must be synchronized in frequency, phase, and voltage before the transfer is initiated. A transfer example is: the source (e.g., S2) from which the load is being transferred remains closed until the alternate source (e.g., S1), to which the load is being transferred, is also closed. After both have been closed, the source (e.g., S2) from which the load is being transferred is opened (trip). The period of time that both sources are closed may be specified at less than 100 milliseconds. If closed transition synchronization is not achieved within the window in the settable time period, the unit goes into In-phase transition which is an open transition that occurs when both sources are in-phase. The advance angle is calculated based on the frequency difference between the two sources and also the response time of the breaker or contactor. This results in the optimum reconnect angle of about 0 degrees for all of the frequency difference values. When the phase difference is within the advance angle window, the "transfer" command is given. If the phase difference is not within the advance angle window in the settable time period, then the switch transfers by the use of Load Voltage Decay. Load voltage measurements are sensed back EMF that is generated when the transfer switch is in the Neutral position. It provides a delay in transfer in either direction if an unacceptable level is sensed as established by a (typically user) programmed or defined level. The transfer will not take place until the back EMF decays below the acceptable level.

Closed Transition default to Time Delay Neutral: Closed Transition will temporarily parallel two live sources in a make-before-break scheme when performing a transfer. Both sources must be synchronized in frequency, phase, and voltage before the transfer is initiated. A transfer example is: the source (e.g., S2) from which the load is being transferred remains closed until the alternate source (e.g., S1), to which the load is being transferred, is also closed. After both have been closed, the source (e.g., S2) from which the load is being transferred is opened (trip). The period of time that both sources are closed may be specified at less than 100 milliseconds. If synchronization is not achieved within the window in a defined (e.g., settable) time period then the switch transfers with a delay that is set for Time Delay Neutral (delay setting in neutral).

Closed Transition defaults to Load Voltage Decay mode: Closed Transition will temporarily parallel two live sources in a make-before-break scheme when performing a transfer. Both sources are synchronized in frequency, phase, and voltage before the transfer is initiated. A transfer example is: the source (e.g., S2) from which the load is being transferred remains closed until the alternate source (e.g., S1), to which the load is being transferred, is also closed. After both have been closed, the source (e.g., S2) from which the load is being transferred is opened (trip). The period of time that both sources are closed may be specified at less than 100 milliseconds. If synchronization is not achieved within the window in the settable time period, then the switch transfers, by the use of Load Voltage Decay. Load voltage measurements are sensed back EMF that is generated when the transfer switch is in the Neutral position. It provides a delay in transfer in either direction if an unacceptable level is sensed as established by a (typically user) programmed or defined level. The transfer will not take place until the back EMF decays below the acceptable programmed/defined level.

In-Phase defaults to Time Delay Neutral: In-phase transition is an open transition that occurs when both sources are in-phase. The advance angle is calculated based on the frequency difference between the two sources and also the response time of the breaker or contactor. This results in the optimum reconnect angle of about 0 degrees for all of the frequency difference values. When the phase difference is within the advance angle window, the "transfer" command is given. If the phase difference is not within the advance angle window in the settable time period, then the switch transfers with a delay that is set for Time Delay Neutral (delay setting in neutral).

In-Phase default to Load Voltage Decay mode: In-phase transition is an open transition that occurs when both sources are in-phase. The advance angle is calculated based on the frequency difference between the two sources and also the response time of the breaker or contactor. This results in the optimum reconnect angle of about 0 degrees for all of the frequency difference values. When the phase difference is within the advance angle window, the "transfer" command is given. If the phase difference is not within the advance angle window in the settable time period, then the switch transfers by the use of Load Voltage Decay. Load voltage measurements are sensed back EMF that is generated when the transfer switch is in the Neutral position. It provides a delay in transfer in either direction if an unacceptable level is sensed as established by a user programmed level. The transfer will not take place until the back EMF decays below the acceptable programmed or otherwise defined level.

Referring to FIG. 1, a power system P with an ATS Bypass switch assembly 3 is shown. The assembly 3 includes the ATS and the Bypass switches 1, 2, respectively, and an automatic control circuit 4. The power system P is configured with three power sources, 9, 10, 11 that can selectively electrically connect to the system load 12 through the ATS Bypass assembly 3. The control circuit 4 can be configured to provide automatic control of both sub-switches 1, 2 and can be any electrical, electromechanical, or electronic devices that have inputs of the status of the switches 1, 2 and output for the different functionality of the switch 3.

Bypass switches (e.g., employing contactors or circuit breakers) of known ATS Bypass switch assemblies always operate only manually. If manual operation is required whenever the ATS switch 1 is removed, personnel (e.g., maintenance personnel) must remain located near the ATS bypass switch if power from the currently employed power source goes off and manual switching of the Bypass switch to the other power source is required.

Still referring to FIG. 1, the system load 12 generally selectively receives power through the ATS Bypass switch assembly 3 from three separate power sources: a first power source (S1) 9, a second power source (S2) 10, and a third power source (S3) 11. In this example, the ATS switch 1 is a draw-out switch and the Bypass switch 2 can either be a draw-out switch or a fixed switch. The ATS switch 1 can have an open position (as shown), a first closed position where the system load 12 is electrically connected to the first power source (S1) 9, and a second closed position where the system load 12 is electrically connected to the second power source (S2) 10, by switching the switch 5 though electric signals 7 from the control circuit 4. The Bypass switch 2 can have an open position (as shown), a first closed position where the system load 12 is electrically connected to the first power source (S1) 9, and a second closed position where the system load 12 is electrically connected to the third power source (S3) 11, by switching the Bypass switch 6 though electric signals 8 from the control circuit 4.

Each of the ATS switch 1 and the Bypass switch 2 can comprise electrical switching components or apparatus, such as, for example and without limitation, a three-position contactor or a plurality of (e.g., two or more per switch 1, 2) circuit breakers, or even fuses. In some embodiments, the ATS switch 1 can optionally include circuit breakers and the Bypass switch 2 can have a three-position contactor, or the reverse.

The ATS switch 1 and the Bypass switch 2 are coupled to and in electrical communication with respective sets of connections to the first power conductors 9c and also the system load conductors 12c through load connectors 12con.

The ATS Bypass switch assembly 3 has four positions or operational configurations: (1) a first closed configuration coupling and providing electrical communication between the first power source (S1) 9 and the system load 12; (2) a second closed configuration coupling and providing electrical communication between the second power source 10 (S2) and the system load 12; (3) a third closed configuration coupling and providing electrical communication between the third power source 11 (S3) and the system load 12; and (4) a fourth (e.g., without limitation, open; tripped; neutral) configuration that does not couple or provide electrical communication between any of the power sources 9, 10, 11 and the system load 12. See, e.g., FIGS. 7A-7D, for examples of different electrical connections that can automatically selected and engaged.

Figure 2A:
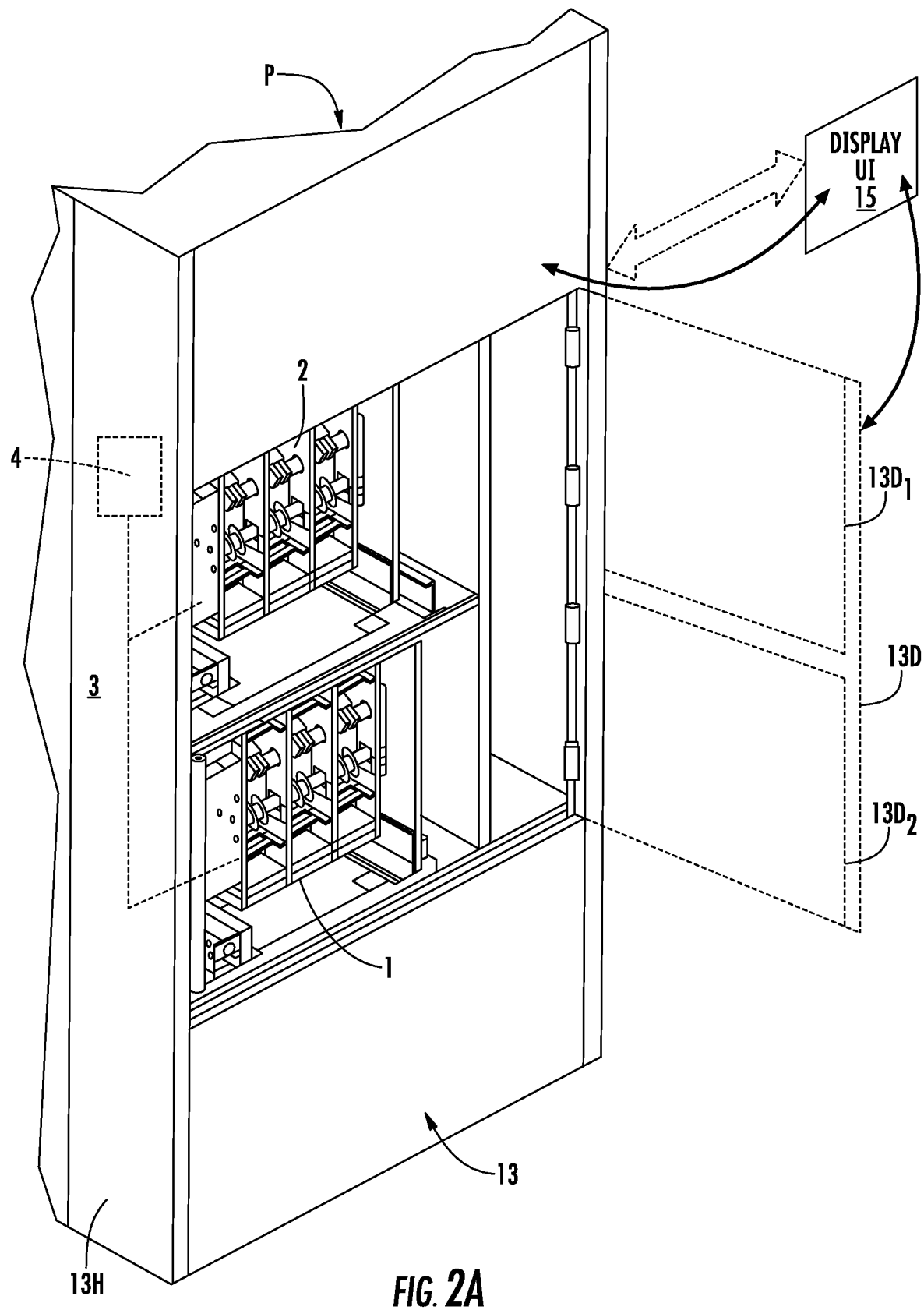
FIGS. 2A and 2B are partial isometric view of a power system with a contactor type ATS with Bypass assembly according to embodiments of the present invention.
Figure 2B:
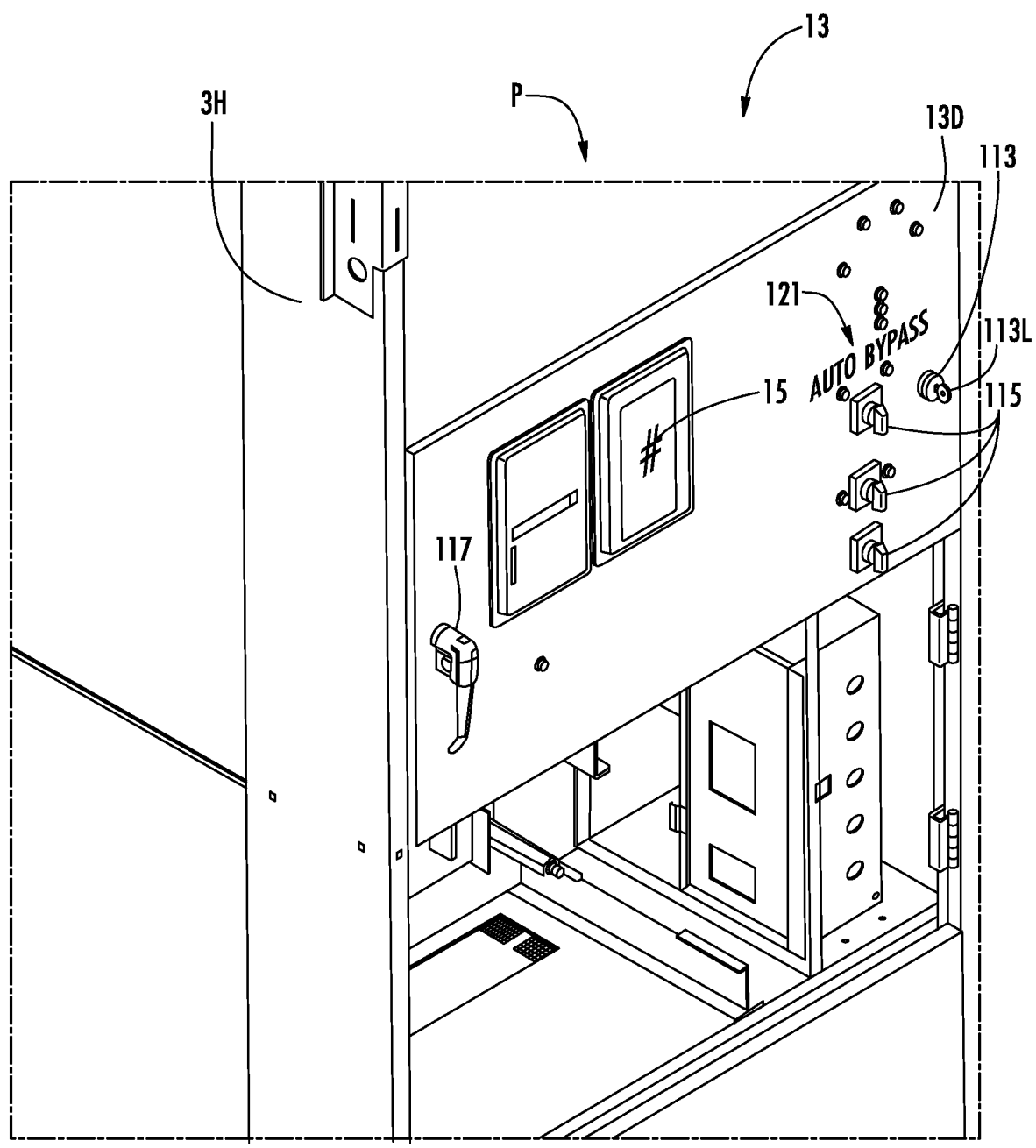

As shown in FIGS. 1, 2A and 2B, the ATS Bypass switch 3 can reside in an enclosure 13 that encases the ATS switch 1 and the Bypass switch 2, one of which can reside above the other. The enclosure 13 can be configured as an external single cabinet housing 13H with a draw-out mechanism (not shown) for the ATS switch 1 and the Bypass switch 2 can either be a fixed or a draw-out type device. The enclosure 13 can be configured with a plurality of adjacent enclosures such as a single primary enclosure and adjacent secondary enclosure that is attached to the primary enclosure and holds all or part of one of the switches 1, 2 (e.g., in a "piggy" back arrangement).

The control circuit 4 can also partially or totally reside in the enclosure 13 as schematically illustrated by the broken line box in FIG. 2A. The ATS switch 1 and the Bypass switch 2 may have substantially the same configurations and/or components. For example, each can comprise three position contactors or four circuit breakers of the same size and power ratings and may occupy the same footprint in the enclosure. The enclosure 13 includes conductors and respective contacts and/or connectors 9C, 10C, 11C, 12C that connect to external public or private power grids, generators or other power sources.

The enclosure 13 can be or form part of a power system P with the ATS Bypass assembly 3. The ATS assembly 3 can be in communication with a User Interface (UI) device 15 which may include, for example, a display to provide operational status of the load/power source, for example. The UI device, e.g., display 15 can be onboard the housing enclosure 13, typically onboard an access door 13D of the housing enclosure and may be externally visible. The display 15 and/or another display in communication with the circuit 4 can be remote from the enclosure 13. Systems employing the ATS assembly 3 can be configured to provide a UI allowing input and/or output of the operational status, including alerts, audible and/or visual, to the local (onboard) display and/or a remote display associated with a smart phone, electronic notebook or pad or portable or desktop computer, for example. The display 15 can be hardwired to the control circuit 4. In some embodiments, the control circuit 4 may wirelessly communicate with the display 15.

The control circuit 4 is configured to provide automatic control employing any suitable electrical, electromechanical (e.g., without limitation, relays) and/or electronic devices and/or any suitable circuit components using a controller or controllers (e.g., a digital signal processor and/or an IC) that can receive inputs regarding status of the ATS switch 1 and the Bypass switch 2, and transmit command outputs, e.g., electrical control signals, to the ATS switch 1 and the Bypass switch 2 for automatic control of the functions of the ATS switch 1 and the Bypass switch 2 in the housing 13.

The cabinet housing 13H may be configured as a single enclosure 13 with at least one access door 13D (FIGS. 2A, 2B). The access door 13D can allow the ATS switch 1 to be removed for maintenance. The access door 13D can also be configured to allow the Bypass switch 2 to be removed or accessed. The door 13D can be provided as two separate doors 13D$_1$, 13D$_2$, as shown schematically in FIG. 2A.

Figure 3:
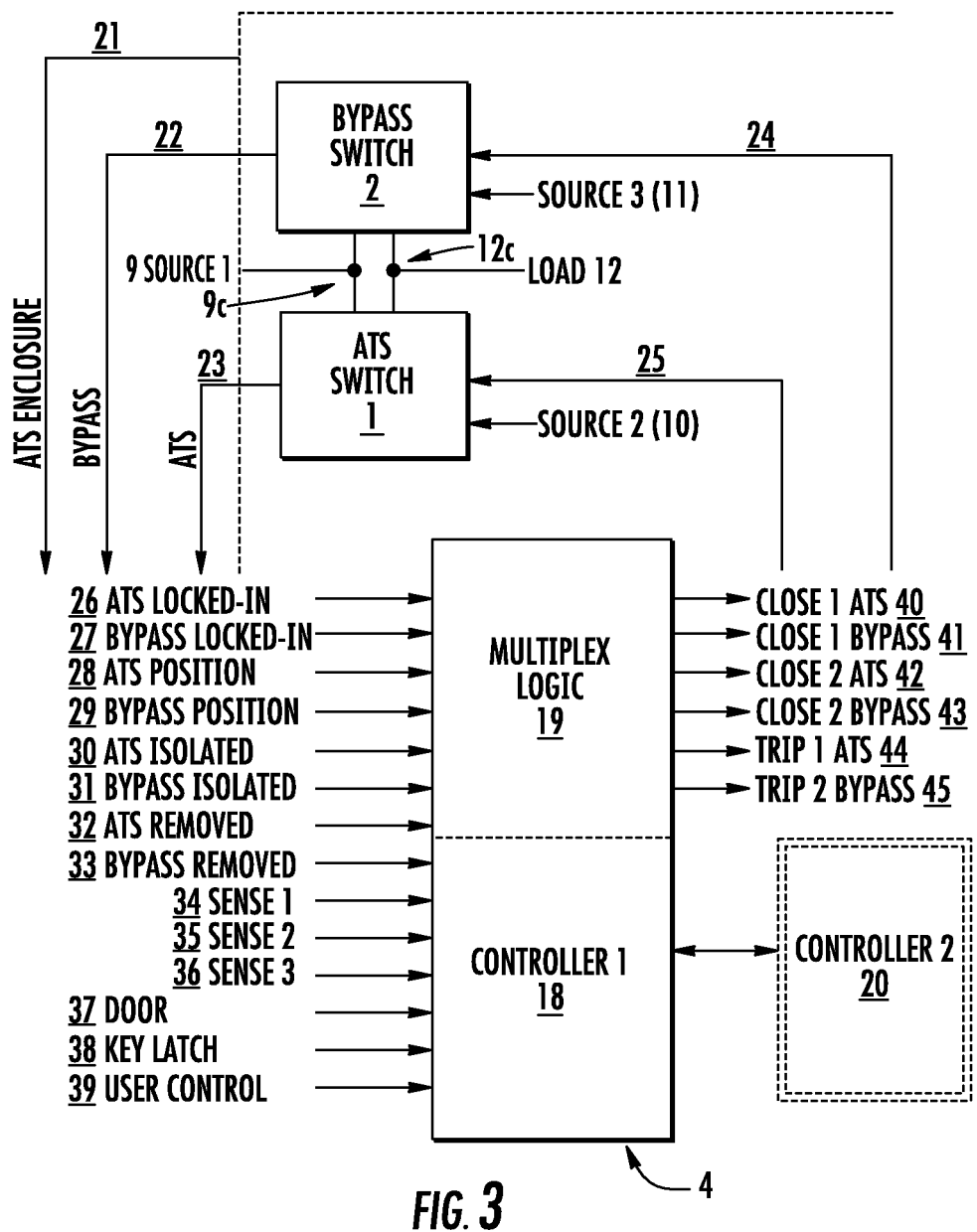
FIG. 3 is an exemplary schematic block diagram showing some of the control and feedback signals along with an optional redundant controller according to embodiments of the present invention.

The control circuit 4 can be configured with any suitable components. As schematically shown in FIG. 3, the control circuit 4 can be configured with at least one controller 18 that is configured as or communicates with a PLC 19. The controller 18 can comprise an ATS switch controller interfaced to the PLC 19. As also shown in FIG. 3, the control circuit 4 can optionally include a redundant controller 20 that can take over for controller 18 if errors are detected. In other embodiments, the two controllers 18, 20 can cooperate to receive and/or send appropriate control signals to one or both switches 1, 2.

The control circuit 4 can be configured to have an automated/automatic control mode whereby the control circuit 4 is configured to be in electronic communication with operating inputs/outputs and/or mechanisms 7, 8 of the respective switches 1, 2. The control circuit 4 can be configured to be, for example and without limitation, electrically coupled; electronically coupled directly or indirectly wirelessly or hard-wired to the operating inputs/outputs or mechanisms 7, 8 (FIG. 1) of the switches 1,2. These switches 1, 2 will allow, with logical signals from the control circuit 4, an automated transfer control of the three source 9, 10, 11 switching device 3.

As a non-limiting example, the control circuit 4 can comprise an ATS switch controller of an ATC-300+, an ATC-600, an ATC-800 or an ATC-900 ATS switch controller marketed by Eaton Corporation of Arden, N.C., or any other suitable controller. These controllers can sense power line currents and voltages and determine whether frequency, phase and voltage magnitude of two different power sources (a transferor and transferee source), such as two of different power sources 9, 10 and 11, are suitably matched, and can respond to a variety of user or other input commands in connection with the ATS bypass switch 3 (e.g., without limitation, go to neutral; emergency inhibit; go to a second power source; lockout). As an example of another alternative configuration, the control circuit 4 can comprise an ATS switch controller 18 and a PLC 19, such as shown in FIG. 3. This configuration can also be implemented by any suitable number of components including processors, such as, for example and without limitation, a single digital signal microprocessor or controller.

The control circuit 4 can receive inputs from a variety of defined sources to provide the automated operation of transfer of power between the three sources 9, 10, 11 using the two switches 1, 2. For example and without limitation, the control circuit 4 can monitor or detect the open or closed status of a door 13D of the enclosure 13 (FIG. 2A) based upon signal 37 (FIG. 3), a key presence or absence or position signal for key 113 for a lock 113L of the door of the enclosure 13 or handle 117 (open or closed) is based upon signal 38 (FIG. 3), human interface switches (not shown) or other defined inputs of the control circuit 4 and determine whether to switch and if it is safe to switch between the power sources 9, 10, 11.

The ATS switch 1 includes one or more movable conductive switch members 5, such as an arm or other movable conductive contact, that selectively engages the system load 12 and source S1 or S2. The Bypass switch 2 includes one or more movable conductive switch members 6, such as an arm or other movable conductive contact, that selectively engages the system load 12 and source S1 or S3. Thus, the sub-switch 1 can be configured to communicate with source S1 but not S3. Similarly, the sub-switch 2 can be configured to communicate with S1 but not S2.

The members 5, 6 (FIG. 1) may be controlled by respective operating mechanism s7, 8 (e.g., without limitation, switching components apparatus; electromagnetic coils; springs) that operate when a defined input signal(s) is presented from the control circuit 4, which can be in communication with both of the operating mechanisms 7, 8 for automatic control thereof. The operating mechanisms 7, 8 and the movable respective conductive switch members 5, 6 are not shown in detail as it will be readily understood by those of skill in the art that the operating mechanisms 7, 8 move the switch components of the respective switch assembly 1, 2 to close on one source, close on the other source, and open or trip.

Generally stated, embodiments of the present invention can provide a three power source Automatic Transfer Bypass switch 3 with redundancy in the automation, typically in one cabinet 13H or external housing enclosure. The ATS Bypass switch 3 is configured so that that the Bypass switch 2, either a contactor or a breaker type, can operate automatically or manually. The switch assemblies 1, 2 can each be electrically coupled to the system load 12. Further, the switch assemblies 1, 2 can be structured for single or three phase type power systems P and can selectively engage one power source at a time unless closed transition type scenario is applied.

Figure 8:
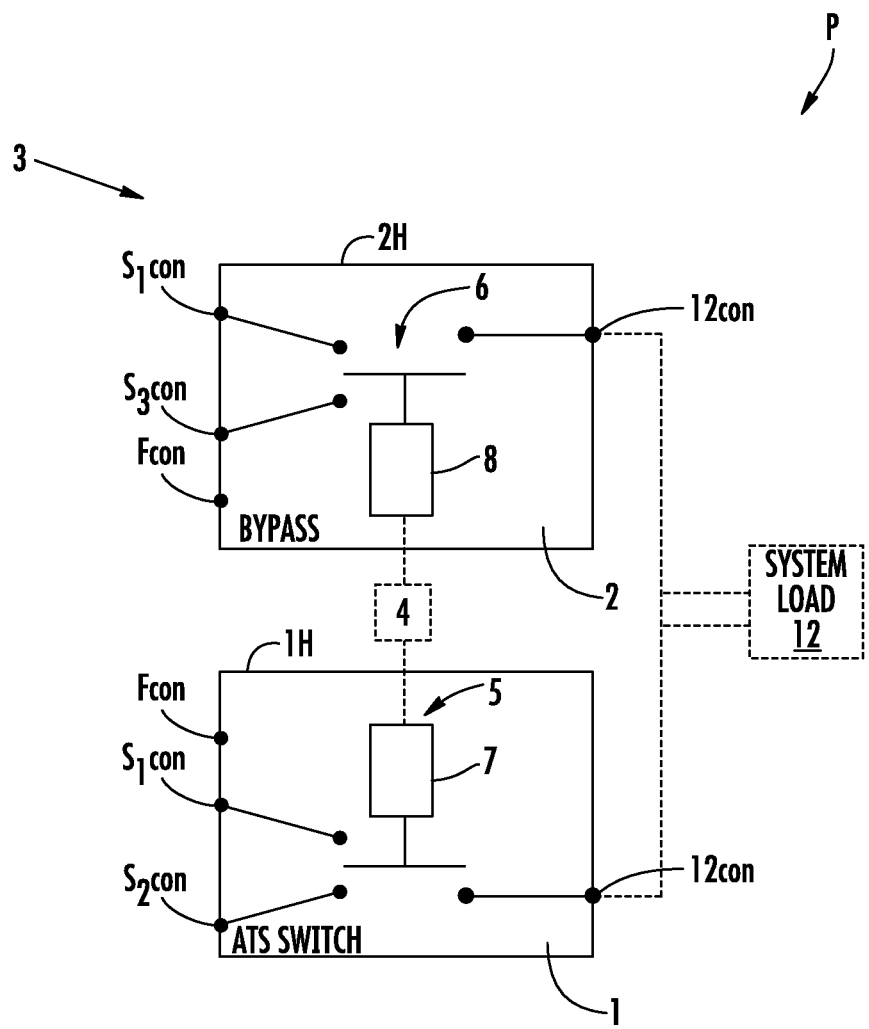
FIG. 8 is a schematic illustration of a data processing system according to embodiments of the present invention.

In conventional ATS Bypass switches 3, the ATS switch 1 is the primary operational component and handles nearly all of the current transfer for the loads 12 during the life of the switch 3 and are not a three power source automated circuit. However, in some embodiments of the present application using three sources, S1, S2, S3, each switch 1, 2 can share in the amount of time that it carries the load power 12, or the operation al time may be otherwise shared, e.g., 30/70, 40/60, 50/50 (in percentages, on average).

Where the ATS switch 1 and/or the Bypass switch 2 are draw-out switching devices, they can have a design having three positions with the compartment door 13D (FIG. 2A) closed (Locked In, Isolated, and Removed). See, U.S. Pat. No. 7,973,253 B2, which is incorporated by reference herein. As shown schematically in FIG. 8, the switches 1, 2 can be held in a respective housing 1H, 2H such as a compartment, drawer, case or (typically rectangular) bucket that allows the respective device/assembly 1, 2 to be removed from the system housing 13 as a unitary device. The switch assemblies 1, 2 can include onboard primary and secondary connectors, S1con, S2con, 12con and Fcon. In the removed state, the primary and secondary connectors are disconnected and the switch assembly, either 1, 2, is ready for removal. The respective drawout switching device configuration can include both primary and secondary disconnects to provide for the draw-out functioning. The primary contacts on each switch assembly (e.g., contactor) are the S1, S2, and load contacts 12. The secondary contacts Fcon are the control and feedback contacts. The operating mechanisms 5, 6 is electrically operated and can also have a mechanical (manually engaged) operation if required in an emergency. When withdrawn, the ATS or Bypass switching device 1, 2 can be inspected, tested, and minor maintenance performed. When one switching device 1 or 2 has the contactor or breaker in the isolated or removed position, the other ATS 1 or Bypass switch 2 will be used to switch the loads. Both switches 1, 2 can be switched manually with electrical power, switched manually with a tool (with electrical power removed from both of the two power sources), and automatically. This can be carried out using control signals monitored by the control circuit 4, including failsafe and safety input signals.

The ATS switch 1 may optionally include an interlock assembly (not shown). The interlock assembly can be, for example and without limitation, mechanical cables (not shown) or a suitable electrical circuit that will not allow the ATS switch 1 and the Bypass switch 2 to be closed under certain conditions. For a closed transition scenario, only the suitable electrical circuit will be present as it will allow a momentary closure of any two sources 9, 10, 11.

FIG. 3 illustrates exemplary control and feedback signals monitored/input to the control circuit 4 (signals 26-39) and exemplary control signals that can be transmitted by the control circuit 4 (signals 40-45) to the ATS switch 1 and the Bypass switch 2. As shown, the input signals 26-39 are to one controller 18 with an optional back-up controller 20, but the input signals can be input to a plurality of different controllers, PLCs, ICs, or other circuit control components. In addition, the control circuit 4 can reside entirely onboard the power system cabinet 13 or partially onboard the power system cabinet/housing 13. Where external or remote components are included in the control circuit 4, these can communicate via hardwired or wireless connections.

FIG. 3 illustrates that the control circuit 4 can include a controller 18 and a PLC 19 that consider positions of the switches 1,2 from the signals 28, 29 (FIG. 3) as well as the locked-in status thereof from the signals 26, 27 (FIG. 3). In embodiments of the present invention, the control circuit 4 (e.g., controller 18) can provide an operational mode with an entirely automatic control of the three source switch 3 (while allowing manual "emergency" override capability).

Position auxiliary contacts (not shown) for signals 28, 29 (FIG. 3) include mechanical and electrical components (not shown), e.g., without limitation, relatively small switches to provide information on the positions of the switches 5, 6. For example, FIG. 3 shows a signal 28 describing the position of the ATS switch 1 for use in logic decisions, a signal 26 for the ATS switch 1 being locked in (e.g., being racked in all the way to stops), a signal 30 for the ATS switch 1 being isolated, and a signal 32 for the ATS switch 1 being removed. Similarly, a signal 29 describes the position of the Bypass switch 2 for use in logic decisions, and a signal 27 is for the Bypass switch 1 being locked in. Signals 30 and 31 can be used to respectively indicate whether the ATS or Bypass are isolated and signals 32 and 33 can indicate, respectively, whether the ATS or Bypass are removed. The control circuit 4 (typically controller 18) also includes inputs for a signal 37 describing the position (e.g., open; closed) of the door 13D (FIGS. 2A, 2B) of the enclosure 13 and a signal 38 describing the position (e.g., installed; not installed) of a key 113 (FIG. 2B) for a lock 113L (FIG. 2B) and/or handle 117 (FIG. 2B) of the door of the enclosure 13D. The control circuit 4, typically controller 18, also includes outputs to the operating mechanism 7 of the ATS switch 1 for a signal 40 to close the circuit breaker or contactor 1 for the first power source 9, a signal 42 to close the circuit breaker or contactor 1 for the second power source 10, a signal 44 to open the two circuit breakers or contactors 1 for the first and second power sources 9, 10, and outputs to the operating mechanism 7. For the Bypass switch 2, the control circuit 4 can include an output signal for a signal 41 to close the circuit breaker or contactor (not shown) for the first power source 9, a signal 43 to close the circuit breaker or contactor (not shown) for the third power source 11, and a signal 45 to open the two circuit breakers or contactors (not shown) for the first 9 and third power sources 11. The control circuit (e.g., controller 18) can further include inputs for a signal 34 from a sensor associated with that the first power source 9, a signal 35 from a sensor associated with the second power source 10 sense, and a signal 36 from a sensor associated with the third power source 11 to indicate whether a respective power source is available.

The Bypass switch 2 (e.g., draw-out or fixed) and its operating mechanism 8 with switch contacts 6 can be automatically controlled by the control circuit 4 thereby providing an automatic Bypass switch 2, such that the ATS bypass switch 3 is fully automatic and provides a dual redundant automatic switch.

The Bypass switch 2 can be used as an automatic switching device rather than a manual switching device in the case of the ATS switch 1 being locked in at a neutral position, being isolated, or being removed. This allows the three source positions to be realized and automatically be switched as appropriate per the control circuit 4 with a defined logic sequence or sequences (e.g., the multiplex logic 19 and the controller 18). This configuration eliminates the requirement for personnel to remain located near an ATS Bypass switch 3 if power from a currently employed power source goes off since manual switching of the conventional Bypass switch to the other power source was required. It also allows for power redundancy (usually generators) to be available.

The control circuit 4, shown as including controller 18 in FIG. 3, can be configured to cooperate with a multiplex logic 19 to automatically configure the switches 1, 2 for desired electrical connection or disconnection relative to a power source and/or system load and to monitor the configuration of each switch 1, 2. The position of each separable contact (not shown) in the circuit breakers or contactors (not shown), is typically monitored by the control circuit 4 (e.g., controller 18) which responsively controls the respective operating mechanisms 7, 8 for moving between the three configurations (positions) of the switches 1, 2, as appropriate. This can ensure that the system load 12 will not be electrically concurrently coupled (other than for the temporary transition option noted above) to more than one of the three separate power sources 9, 10, 11.

In some particular embodiments, as shown in FIG. 3, the control circuit 4 can include a multiplex logic processor 19 that can be configured to receive signals from the three sources S1, S2, S3 and can selectively deliver the required (defined) ones to the controller 18. The multiplex logic 19 can provide information to the controller 18 and can employ any suitable electrical, electromechanical (e.g., without limitation, relays) or electronic devices or any suitable processor, PLC, IC and/or circuit component that inputs the status and is interfaced to the controller 18. The multiplex logic device 19 can communicate with the controller 18 in any suitable manner, including, for example, any electronic communication, e.g., without limitation, electrically coupled; electronically coupled; sending an electronic pulse, an electrical signal or a wireless signal to the controller 18. These logical signals can be configured to provide the functionality of the three source 9, 10, 11 automatic switching device 3.

In addition, the primary controller 18 can be interfaced to the optional back-up or secondary controller 20 in any suitable manner such as any electronic communication, e.g., without limitation, electrically coupled, electronically coupled, wired or wireless. The controller 18 can be a "master" controller and the controller 20 can be a "slave" controller. With this configuration, the controller 18 can have a backup or redundancy. The ATS Bypass isolation switch 3 thus can have redundancy with the controllers 18, 20, the switch's 1, 2 and the backup power inputs S2, S3, 10, 11, respectively. As noted above, controller 20 is optional and does not need to be included if controller redundancy is not required. Additional controllers may also be used.

The control circuit 4 allows the ATS 3 to be a three source automatic switch, rather than just a two-source switch or a two-source manual switch, and, also, to do a wide range of transitions, such as for example and without limitation, open, closed, in-phase, load voltage decay, delay (Time Delay Neutral), or any sequence of these transitions in any different order.

For the Bypass switch 2, the signals to close on one source 41, trip 45, or close 43 on the other source are transmitted to the switch 2 as control signals from the control circuit 4, e.g., controller 18 (FIG. 3). For the ATS switch 1, the control signals 40, 44, 42 from the control circuit 4, e.g., control circuit 18 (FIG. 3) operate in a similar manner.

Figure 4:
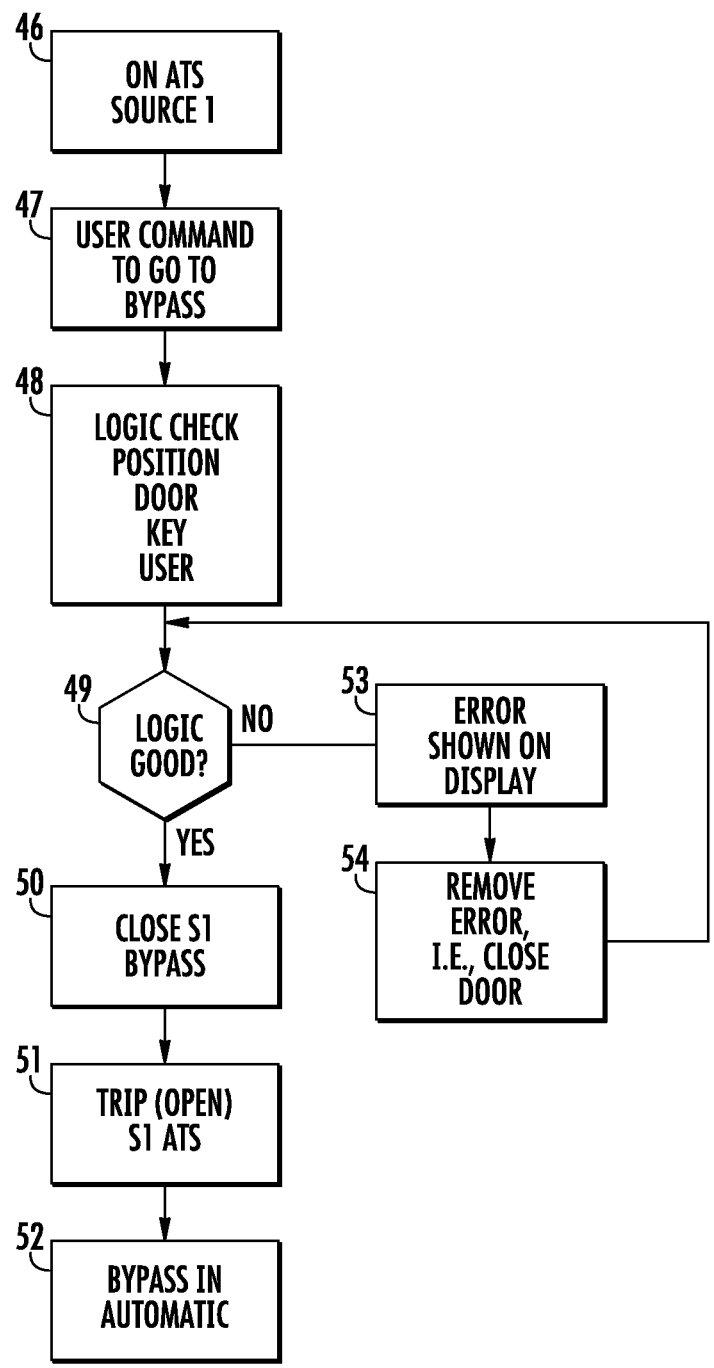
FIG. 4 is a flow chart of an example of operations that can be carried out to direct the switch to go to bypass according to embodiments of the invention.
Figure 5:
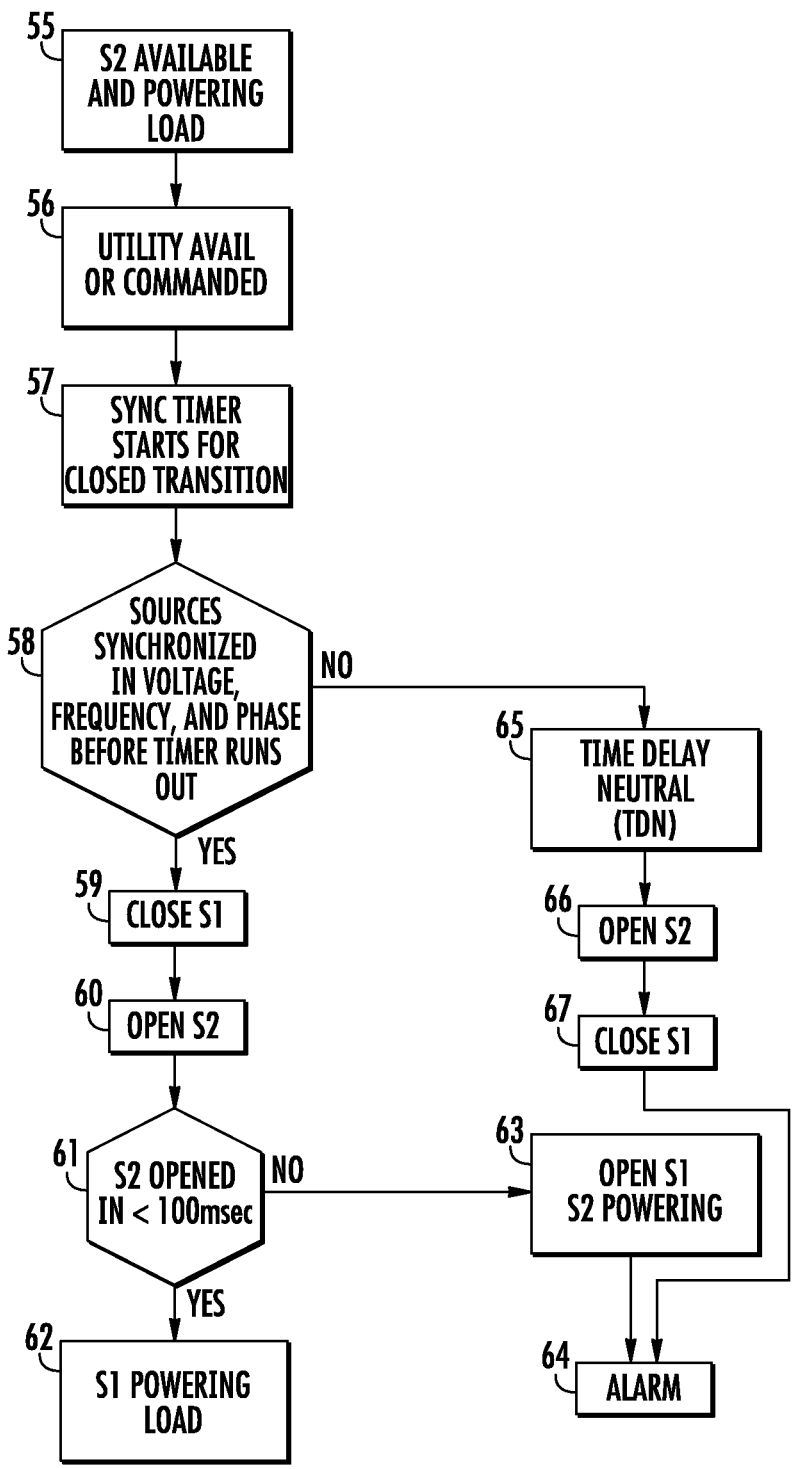
FIG. 5 is a flow chart, as an example, of operations that can be carried-out to direct the switch to go form a Closed Transition default to Time Delay Neutral (Neutral Delay) according to embodiments of the present invention. The exemplary flow chart shows a switch progressing from a source 2 close to a source 1 close.
Figure 6:
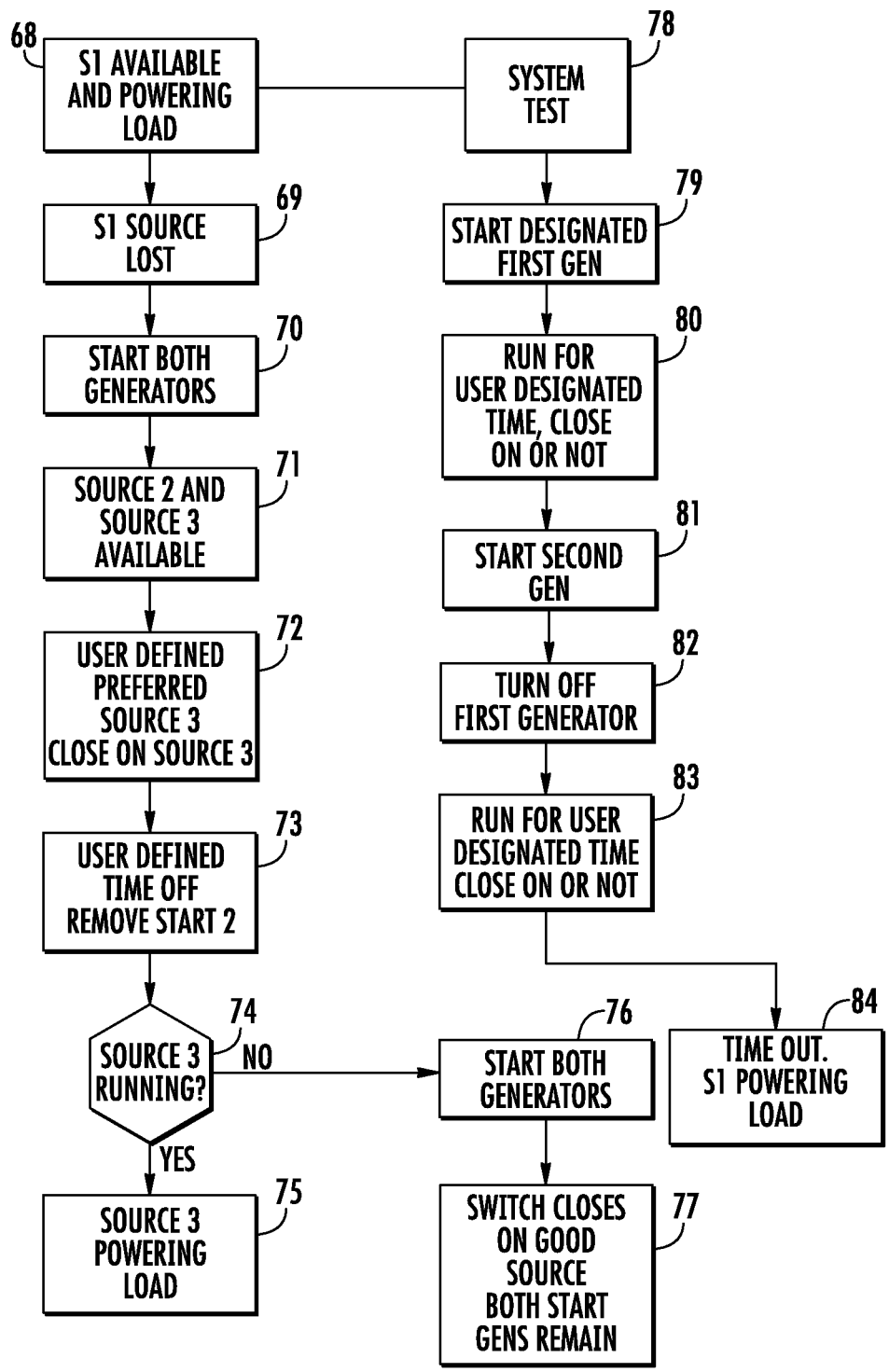
FIG. 6 is a flow chart, as an example, of some timing and testing automatic operations of a three source switch circuit and power system using the three source switch circuit according to embodiments of the present invention.
Figure 7A:
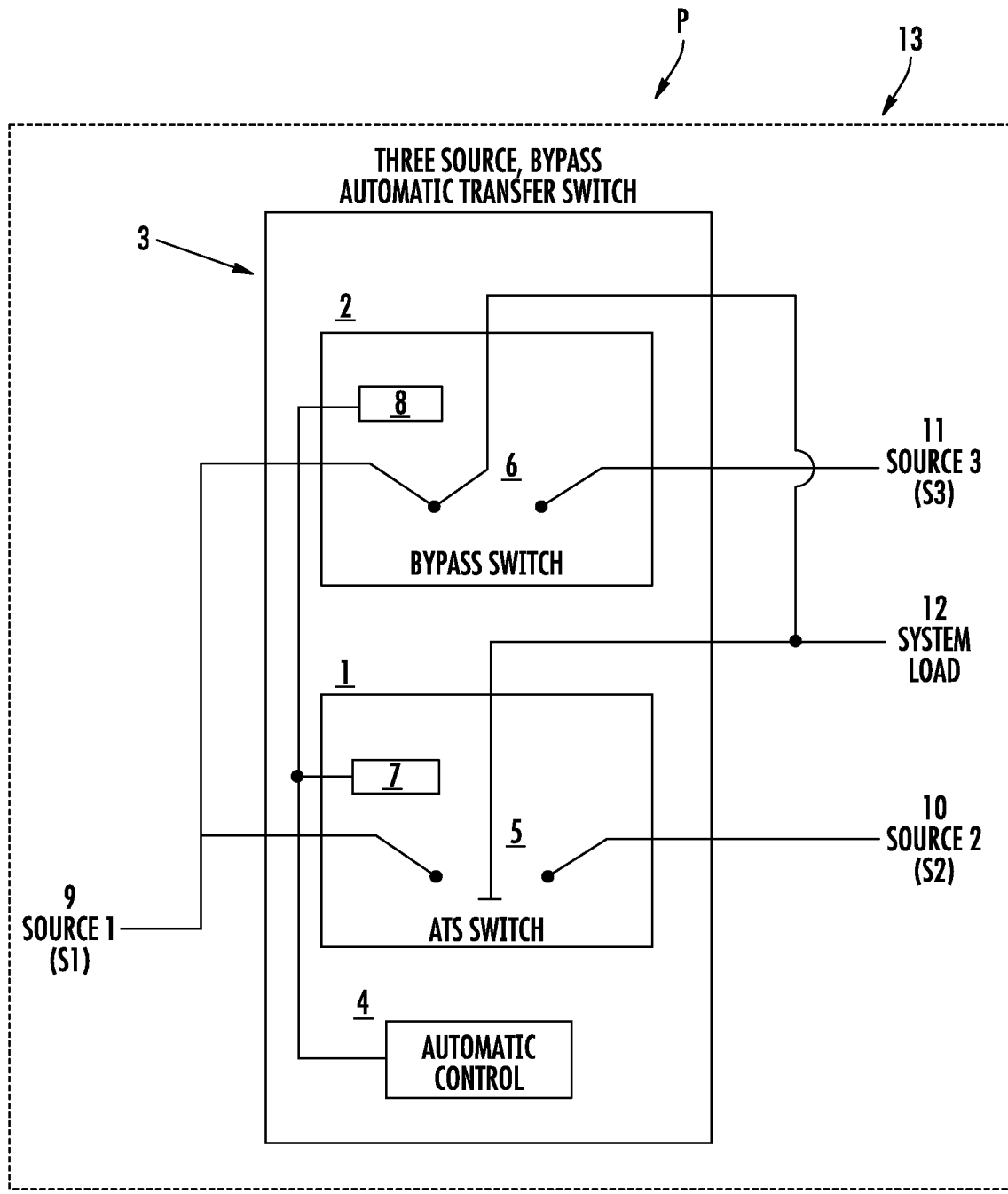
FIGS. 7A-7D are schematic illustrations of power systems that illustrate different electrical contact configurations of the Bypass switch and the ATS switch according to embodiments of the present invention.
Figure 7B:
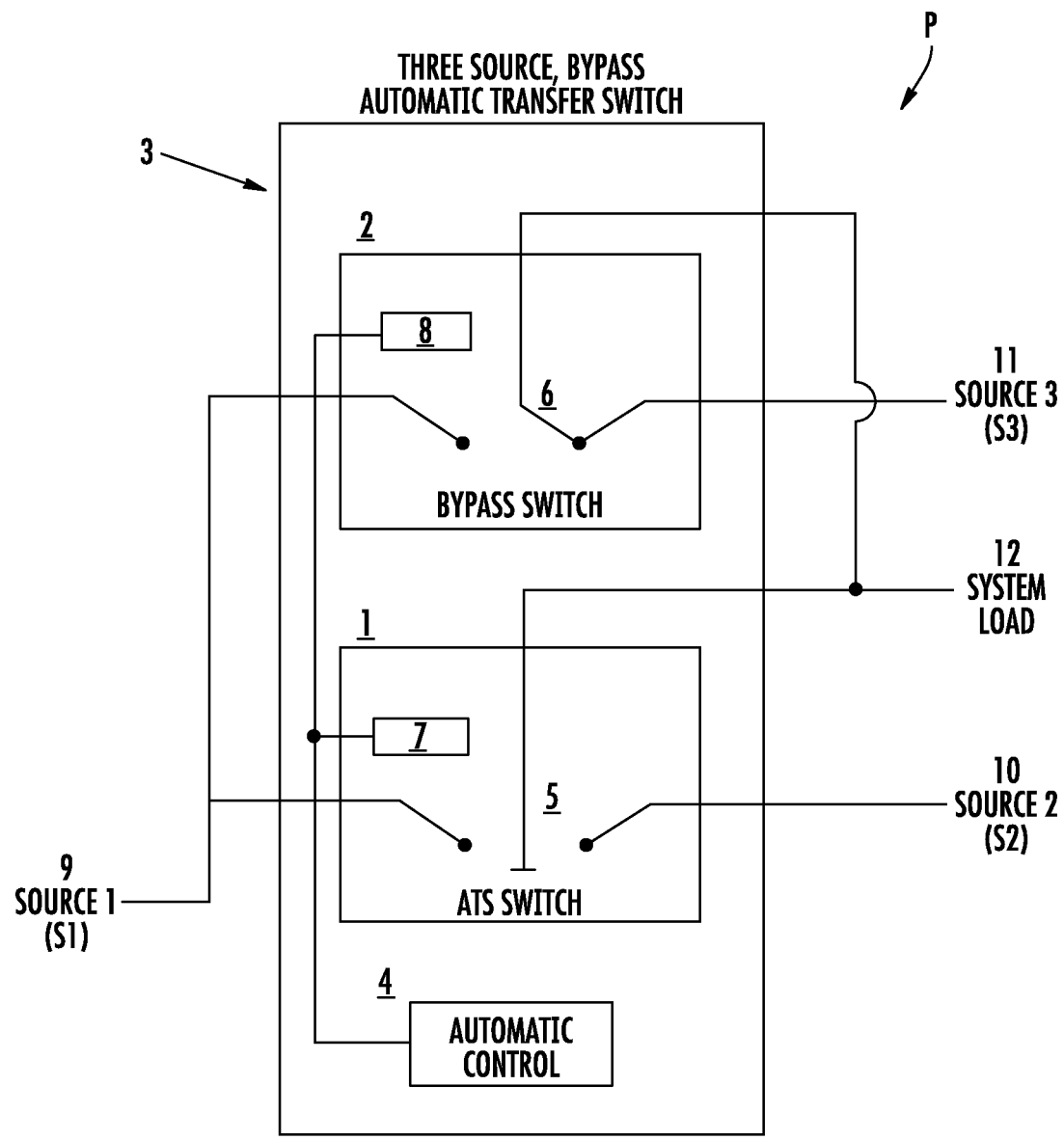
Figure 7C:
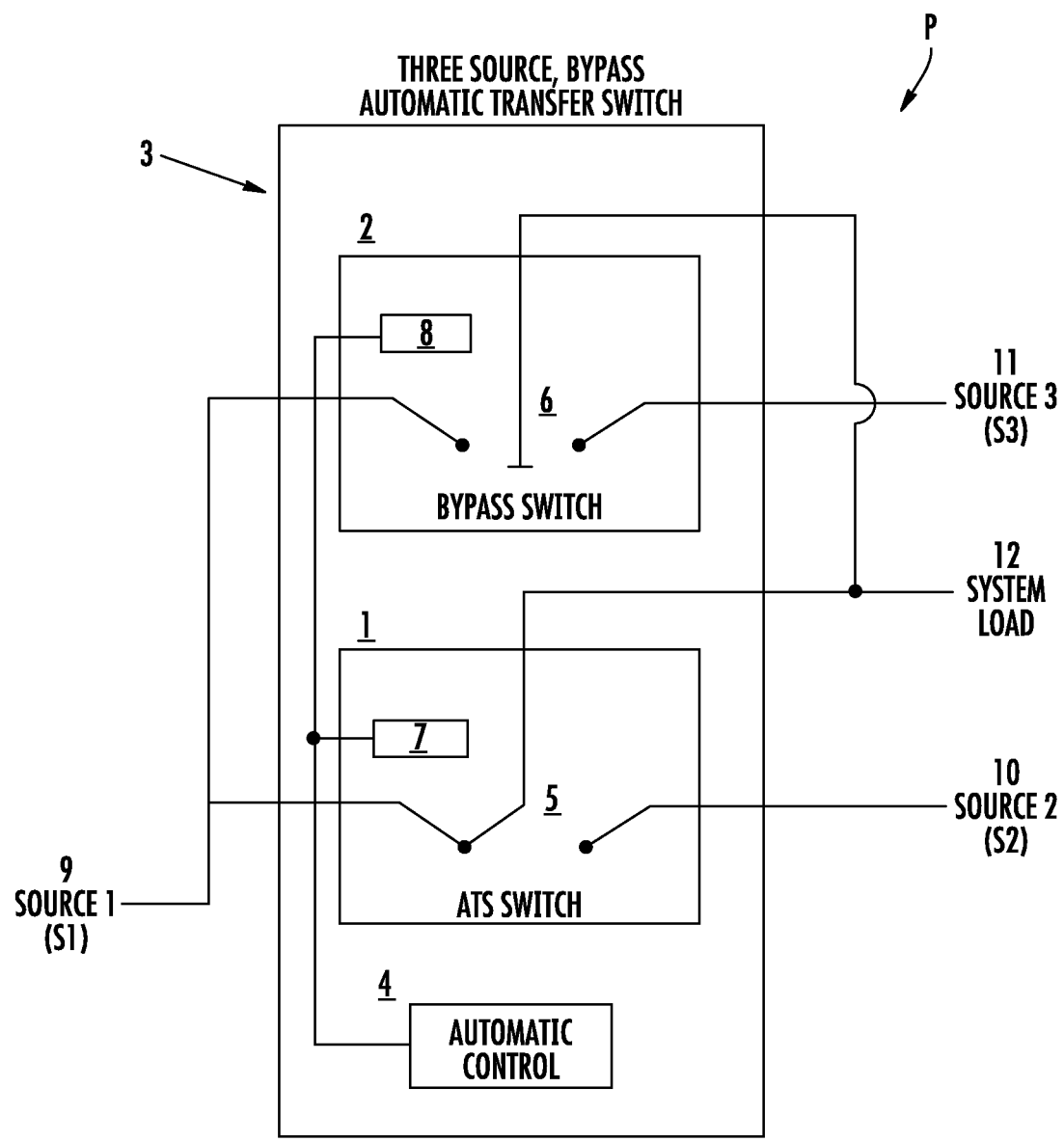
Figure 7D:
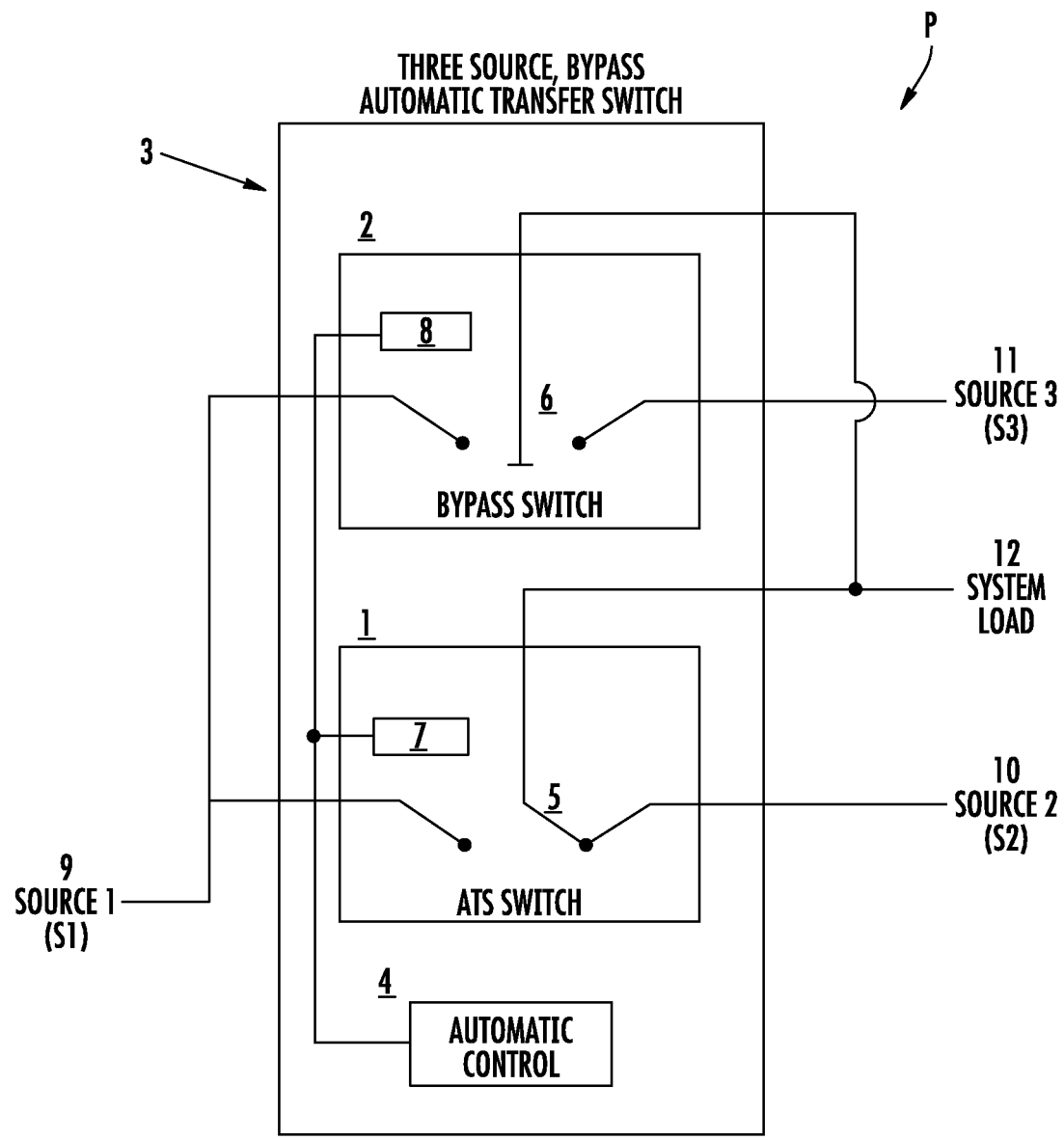

The switch 3 can be configured to carry out a wide range of transitions, such as for example and without limitation, open, closed, in-phase, load voltage decay, delay (Time Delay Neutral), or any sequence of these transitions in any different order. FIGS. 4, 5 and 6 are flow charts of examples of switch operation.

An example of a switch 3 electrically switched from the ATS switch 1 to the Bypass switch 2 is shown in FIG. 4. With the ATS switch 1 closed on power source 1 (S1) 9 (block 46), a user commands the switch 3 to go to the bypass switch 2 (block 47). This can be input through a UI on the display 15 (FIG. 2A) and/or hand switches 115 (FIG. 2B) on the enclosure 13. The defined inputs associated with the logic performs safety checks such as position checks of door, keys or user (block 48) to make sure, for example that both switches 1, 2 are locked in per signals 26, 27 (FIG. 3). If the logic signals are appropriate (block 49), then the control circuit 4 will send a command to close source 1 (S1) on the Bypass switch 2 (block 50). After the ATS and Bypass switch positions from signals 28, 29 (FIG. 3) are read and confirmed, the control circuit 4 will send a command 44 to trip (open) source 1 to the ATS 1 (block 51). The Bypass 2 now carries the power from S1 9 to the load 12 (block 52). If in the event that the logic (block 49) does not show a match or good check, an error is shown (block 53) to a user. The error message can be provided as an audio and/or visual alert on a display that is onboard the housing 13, e.g., or a remote display 15. The message/alert can be sent to a smart phone, electronic tablet, notepad or computer. When the error is cleared (block 54), e.g., the door 13D is properly closed or locked, the control circuit 4 can respond with steps to go to Bypass operation (block 52). It is understood that the reverse operation (Bypass to ATS) can also be carried out.

Preferably and advantageously, both of the ATS switch 1 and the Bypass switch 2 are automatically controlled by the control circuit 4 (e.g., controller 18). The three source switch 3 can perform several types of automatic transfers. An example of a more difficult one is discussed, below, in connection with FIG. 5.

Known transfer switches of the "open-transition" type provide a break-before-make transfer sequence. In other words, the system load 12 is electrically disconnected from one power source, prior to being electrically connected to another power source. The transfer sequence may be relatively quick and depends on what type of time delays are set in the control circuit 4. Three examples of these time delays include Time Delay Normal to Emergency (TDNE), Time Delay Neutral (TDN), and Time Delay Emergency to Normal (TDEN). The TDN, for example, when set, takes place when the system load 12 is transferred in either direction to prevent excessive in-rush currents due to out-of-phase switching of relatively large motor loads. With any of these time delays being set, the delay of the transfer times-out before a transfer will occur. With an open transition a power interruption is noticeable to the system load 12 being serviced.

FIG. 5 shows a routine for a Closed Transition default to Time Delay Neutral (Neutral Delay) (TDN). It could also default to a Load Voltage Decay (LVD) (not shown). Although the exemplary routine in FIG. 5 shows the ATS switch 1 progressing from the second power source 10 carrying the load to closing on the first power source 9, persons of ordinary skill in the art will appreciate that the ATS switch 1 can progress from the first power source 9 carrying the load to closing the second power source 10 in a similar manner. It is also understood that the Bypass switch 2 can operate to accomplish the same scenario. It is also understood that the three sources can be used in the scenarios given for any of the transitions of the switch 3.

In FIG. 5, the Closed Transition will temporarily parallel two live power sources, example 10, 9 in a make-before-break manner when performing a transfer. Both power sources 10, 9 are synchronized in frequency, phase, and voltage before the transfer is initiated within a defined time frame (block 58).

At initiation, as a transfer example, the second power source (S2) 10 is available and powering the load (block 55). The utility is selected or commanded (block 56) and a sync timer starts for the closed transition (block 57). The load will be transferred from the power source (S2) 10 to another power source. S2 remains connected until the power source to which the load is being transferred S1 (in this example) is also closed (block 59). In this example, the second power source S2 10 is connected and the preferred next source S1 becomes available within a defined time (block 58). After both have been closed/connected via the switch, the second power source S2 10 from which the load is being transferred is disconnected as indicated by the opened (tripped) circuit at (block 60). The period of time that both power sources S2, S1 are connected to the load (e.g., closed in the circuit), for example and without limitation, less than about 100 milliseconds (block 61). If this occurs within this time, S1 is powering the load (block 62). If the trip detected from signals 44 or 45 (FIG. 3) does not happen in the allotted time, then the command to trip source 1 S1 (block 63) will be initiated with the power load still connected to S2 (block 63). An alarm will be generated for the user (block 64).

If synchronization (block 58) is not achieved within the window in the settable time period (block 57), then the switch transfers with a delay that is set for Time Delay Neutral (delay setting in neutral) (TDN) (block 65). The command to open S2 with signal 44 (FIG. 3) will be implemented (block 66). When input position signal 28 (FIG. 3) verifies the action, then a close of S1 (block 67) will be implemented. Since the unit did not sync, the alarm will be generated for the user (block 64).

For a Closed Transition default to Load Voltage Decay (LVD) mode (not shown) example, if synchronization is not achieved within the window in the time period (block 58), then the switch transfers by the use of Load Voltage Decay (LVD). Load voltage measurements are sensed back EMF that is generated when the switch is in the neutral position. This provides a delay in transfer in either direction if an unacceptable level is sensed as established by a defined and/or programmed level. The transfer will not take place until the back EMF decays below the acceptable defined and/or programmed level.

FIG. 6 illustrates a routine for controlling the S2 10 and S3 11 sources (generators or other power sources) through the ATS Bypass switch 3. Although there are many different scenarios that may be used, due to the flexibility of the programmability and options that a user or OEM has, an example is shown with S2 10 and S3 11.

S1 is powering the system load (block 68). If S1 9 is lost, goes off line or is otherwise unavailable (block 69) a powering mode can be that both alternate power sources, e.g., generators, S2, S3 will power-up or start (block 70). Although both generators or other power sources S2, S3 are not required to start, this is usually desired in a redundant generator system.

The user or an OEM can predetermine what power source is the preferred power source (or rank in order of preference) and if both start and supply available power, then the switch 3 will transfer power to the preferred power source (block 72). There are options to make the preferred power source (e.g., generator) be alternated or changed based on with every other lost power or start time or a defined amount of run time. The less or non-preferred power source (e.g., generator) can time out at an OEM or user defined time and shut off (block 73). If the preferred power source (e.g., generator) continues to run (block 74), then this power source will power the load until S1 returns (block 75). If the preferred generator goes out, malfunctions or sputters, then the other back-up power source (e.g., generator) will start after a pre-determined time so that there could be two generators running (block 76). The switch will close on the good source available (block 77). Both power sources can remain on since the preferred generator discontinued or was unable to supply available power to the load for a short time or it stopped altogether.

For a system test (block 78), the designated or preferred power source (e.g., generator) will start first (block 79) and can run for a predetermined time (block 80). The test time can be a default setting or a user setting. A user or a test default action can determine if the switch should close onto the load from the generator or just do a generator test (block 80). After a predetermined time, the first power source (e.g., generator) will shut down or go off and the second power source (e.g., generator) will start (block 81) and run similar to the first power source test action (block 82). When completed at the end of the test cycle, the load, if it was transferred, can operate on S1 (block 84).

Figure 9:
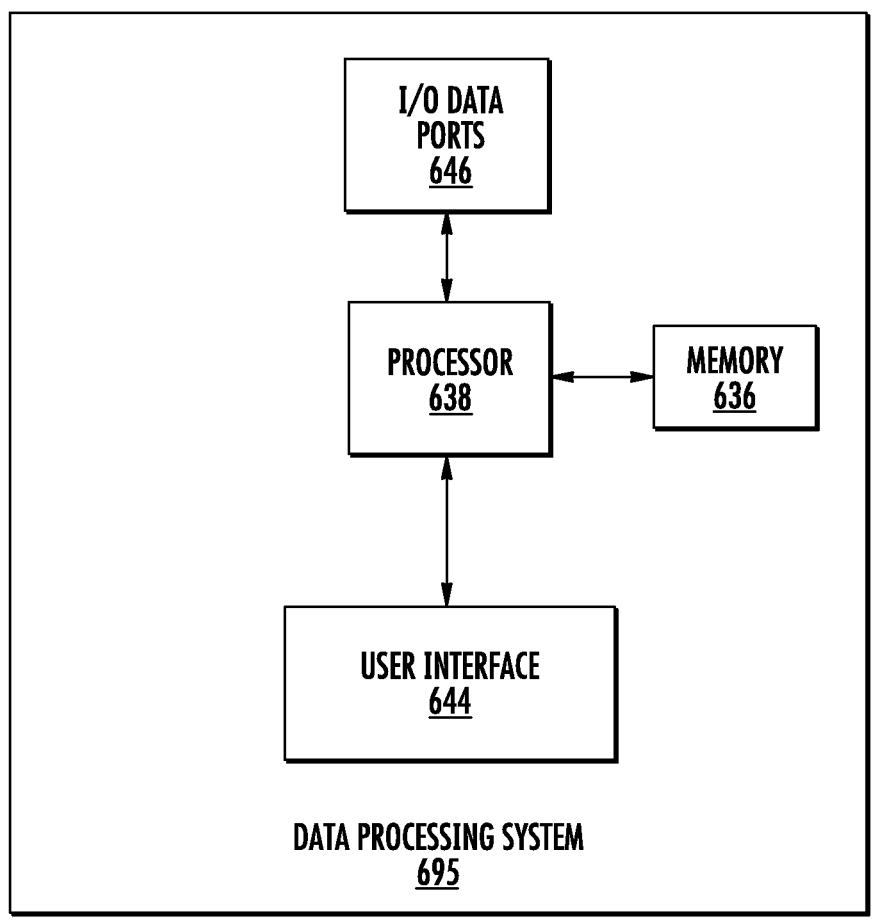
FIG. 9 is a schematic illustration of a data processing system according to embodiments of the present invention.

FIG. 9 is a schematic illustration of a data processing system 695 according to embodiments of the present invention. Embodiments of the present invention may software and hardware aspects, all generally referred to herein as a "circuit" or "module." Software operation may be implemented using discrete hardware components, one or more Integrated Circuits (IC), analog devices, application specific integrated circuits (ASICs), or at least one programmed digital signal processor or microcontroller. Where used, the processor(s) can be commercially available or custom microprocessor, microcontroller, digital signal processor or the like.

Referring now to FIG. 9, a data processing system 695 that may be included in or with power system 3 and configured to control, monitor or otherwise interact with the switches 1, 2 in accordance with some embodiments will be discussed. As illustrated in FIG. 9, the data processing system 695 may include a user interface 644, including, for example, input device(s) such as a man machine interface (MMI) including, but not limited to a keyboard or keypad and a touch screen; a display; a speaker and/or microphone; and a memory 636 that communicate with a processor 638 included with the control circuit 4. The data processing system 695 may further include I/O data port(s) 646 that also communicates with the processor 638. The I/O data ports 646 can be used to transfer information between the data processing system 695 and another computer system or a network, such as an Internet server, using, for example, an Internet Protocol (IP) connection. The I/O data ports 646 can also be used for any information used for control outputs and/or inputs to the switch 3. These components may be conventional components such as those used in many conventional data processing systems, which may be configured to operate as described herein.

As discussed briefly above, some embodiments of the present inventive concept provide systems and methods for automatically operating an ATS Bypass switch 3 including automated operation of the Bypass switch 2.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), PHYTHON, C, C++, and/or others for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more ASICs, or a field programmable gate array (FPGA), or a programmed digital signal processor, a PLC, or microcontroller. Where used, PLC code can be programmed with a Ladder type language. As will be further understood by those of skill in the art, a PLC can be a programmable logic unit of various types made by several companies, each of which can be based on logic type coding.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept which are to be given the full breadth of the claims appended now or in the future and any and all equivalents thereof.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A system for powering a load, comprising:
a housing;
an automatic transfer switch withdrawably held in or by the housing configured to selectively (i) connect the load to only a first power source (ii) connect the load to only a second power source, and (iii) disconnect the load from the first and second power sources;
a bypass switch withdrawably held in or by the housing configured to selectively (i) connect the load to only the first power source, (ii) connect the load to only a third power source, and (iii) disconnect the load from the first and third power sources; and
a control circuit in communication with the automatic transfer switch and the bypass switch to automatically direct the bypass switch and the automatic transfer switch to carry out the selective connections with power transitions to the load from the first, second and third power sources,
wherein the automatic transfer switch cannot connect to the third power source and the bypass switch cannot connect to the second power source, and wherein, after a respective power transition, only one of the first power source, the second power source or the third power source powers the load, and
wherein the first power source is a public and/or private power grid, wherein the second and third power sources are back-up power sources, and wherein, after a respective power transition, the second or third power sources are only connected to the load when the first power source is unavailable or during a test mode.

2. The system of claim 1, wherein the bypass switch and the automatic transfer switch each comprise electrical switching apparatus, wherein a closed transition connection between any two power sources of the first, second and third power sources to the load using the bypass switch or the automatic transfer switch is maintained for 100 ms or less during a respective power transition when changing a power source to the load to be a single one power source selected between any of the first, second and third power sources.

3. The system of claim 1, wherein the bypass switch and the automatic transfer switch comprise at least one circuit breaker or at least one contactor.

4. The system of claim 1, wherein the control circuit comprises at least one processor that receives a plurality of defined inputs, including inputs from the bypass switch, the automatic transfer switch, and the first, second and third power sources, and sends output control signals and/or directs another circuit component to send output control signals for changing an operative status of the automatic transfer switch and/or the bypass switch.

5. The system of claim 1, wherein the automatic transfer switch and the bypass switch each have three defined positions relative to the housing including a locked-in position, an isolation position in the housing and a removed position, wherein the housing comprises at least one lockable access door and a plurality of sensors that provide input to the control circuit on whether the at least one lockable access door is open or closed, whether the automatic transfer switch is in the locked-in position, or whether the bypass switch is in the locked-in position.

6. The system of claim 1, wherein the automatic transfer switch and the bypass switch reside adjacent each other in different compartments of the housing and are configured so that each can be independently and separately removed from the housing as separate units.

7. The system of claim 1, wherein the automatic transfer switch, the bypass switch and the control circuit performs one or more of the following for a respective power transition: open transition, closed transition, time delay neutral, in-phase transition, and load voltage decay transition from any of the first, second or third power sources to power the load.

8. The system of claim 1, wherein the automatic transfer switch, the bypass switch and the control circuit performs respective power transitions using a closed/in-phase transition default to time delay neutral mode and/or closed/in-phase transition default to load voltage decay mode from any of the first, second or third power sources to power the load.

9. The system of claim 1, wherein the automatic switch, the bypass switch and the control circuit perform closed transition default to time delay neutral mode and/or closed transition default to load voltage decay mode as a respective power transition from any of the first, second or third power sources to power the load.

10. The system of claim 1, wherein the automatic transfer switch, the bypass switch and the control circuit perform in-phase default to time delay neutral mode and/or in-phase default to load voltage decay mode as a respective power transition from any of the first, second or third power sources to power the load.

11. The system of claim 1, wherein the control circuit is configured to provide automatic operation of the automatic transfer switch and the bypass switch using input signals from and control signals to the automatic transfer switch, the bypass switch and the first, second and third power sources, and wherein the control circuit is configured to carry out a plurality of the following:
a) starting one or two of the second and third power sources based on identified predefined conditions;
b) shutting down one of the second or third power sources after a defined time delay;

c) alternating the second and third power sources to act as a primary back up power source based on user input;
d) alternating the second and third power sources to act as a primary back up power source depending on operational time ran;
e) allowing a user settable load or no-load test;
f) identifying a failed or dysfunctional power source and starting another one of the power sources after a defined time; and
g) running a load or no-load test with a defined test routine on one or more of the power sources and using one or both of the automatic transfer switch or bypass switch based on a programmable calendar to select a test.

12. The system of claim 1, wherein the control circuit is configured to provide all automatic operation of the bypass switch and the automatic transfer switch so that if the automatic transfer switch has a detected fault based on digital and/or analog input signals of switch status, the control circuit disconnects the automatic transfer switch and engages the bypass switch.

13. The system of claim 1, wherein the control circuit is configured to provide all automatic operation of the bypass switch and the automatic transfer switch so that if the bypass switch has a detected fault based on digital and/or analog input signals of bypass switch status the control circuit disconnects the bypass switch and engages the automatic transfer switch, and wherein the bypass switch is configured to handle a 100% power connection to the load with an operational time of 30% or greater, on average.

14. An assembly comprising:
a housing;
an automated transfer switch (ATS) held in or by the housing and configured to connect a load to a first power source or a second power source;
a bypass switch held in or by the housing and configured to connect the load to the first power source or a third power source; and
a control circuit in communication with the ATS and the bypass switch, wherein the control circuit is configured to selectively connect a single one of the first, second, or third power sources to the load such that, after a power transition, only the connected single one of the first, second or third power sources powers the load using one of the ATS or bypass switch, wherein the control circuit is further configured to disconnect the load from any of the first, second or third power sources, wherein the first power source is a public and/or private power grid, wherein the second and third power sources are back-up power sources, and wherein, after a respective power transition, the second or third power sources are only connected to the load when the first power source is unavailable or during a test mode.

15. The assembly of claim 14, wherein the control circuit is configured to provide automatic operation of the ATS and the bypass switch using input signals from and control signals to the ATS, the bypass switch and the first, second and third power sources, and wherein the control circuit is further configured to carry out a plurality of the following:
a) starting one or two of the second and third power sources based on identified predefined conditions;
b) shutting down one of the second or third power sources after a defined time delay;
c) alternating the second and third power sources to act as a primary back up power source based on user input;
d) alternating the second and third power sources to act as a primary back up power source depending on operational time ran;
e) allowing a user settable load or no-load test;
f) identifying a failed or dysfunctional power source and starting another one of the power sources after a defined time; and
g) running a load or no-load test with a defined test routine on one or more of the power sources and using one or both of the automatic transfer switch or bypass switch based on a programmable calendar to select a test.

16. The assembly of claim 14, wherein the control circuit is configured to provide all automatic operation of the bypass switch and the ATS so that if the ATS has a detected fault based on digital and/or analog input signals of switch status, the control circuit disconnects the ATS and engages the bypass switch.

17. The assembly of claim 14, wherein the control circuit is configured to provide all automatic operation of the bypass switch and the ATS so that if the bypass switch has a detected fault based on digital and/or analog input signals of bypass switch status the control circuit disconnects the bypass switch and engages the ATS, and wherein the bypass switch is configured to handle a 100% power connection to the load with an operational time of 30% or greater, on average.

18. The assembly of claim 14, wherein the first power source is a power input to each of the ATS and the bypass switch, wherein the second power source is a power input to only the ATS, wherein the third power source is a power input to only the bypass switch, and wherein the ATS and bypass switch each share an amount of time that each separately carries the load whereby the bypass switch is configured to handle a 100% power connection to the load for 30% or greater operational time, on average.

19. The assembly of claim 14, wherein the ATS and bypass switches are held entirely within the housing, wherein the control circuit comprises at least one processor that receives a plurality of defined inputs, including inputs from the bypass switch, the ATS, and the first, second and third power sources, and sends control signals and/or directs another circuit component to send control signals including control signals for changing switch selection between the ATS and the bypass switch.

20. A method of controlling a power system, comprising:
providing a switch assembly comprising an automated transfer switch and a bypass switch in separate compartments of a single housing enclosure;
electrically coupling a first power source or a second power source via the automated transfer switch;
electrically coupling the first power source or a third power source via the bypass switch;
connecting a load to the switch assembly to selectively electrically engage each of the automatic transfer switch and the bypass switch; and
electronically controlling operation of the switch assembly to automatically engage either the automatic transfer switch or the bypass switch and an appropriate single power source selected from the first power source, the second power source or the third power source at any one time after a respective power transition based on defined logic input conditions and power transition routines, wherein the switch assembly connects only a single one of the first power source, the second power source or the third power source to power the load before or after transitioning power to the load from another single one of the first, second or third power source,
wherein the first power source is a public and/or private power grid, wherein the second and third power sources are back-up power sources, and wherein, after a respective power transition, the second or third power sources are only connected to the load when the first power source is unavailable or during a test mode.

* * * * *

UNITED STATES PATENT AND TRADEMARK OFFICE
CERTIFICATE OF CORRECTION

PATENT NO.         : 10,985,603 B2                                    Page 1 of 1
APPLICATION NO.    : 16/454527
DATED              : April 20, 2021
INVENTOR(S)        : Mark Steven Tomassi It is certified that error appears in the above-identified patent and that said Letters Patent is hereby corrected as shown below:

In the Specification

Column 11, Line 45: Please correct "1311" to read -- 13H --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*